US009785114B2

(12) United States Patent
Fuetterer

(10) Patent No.: US 9,785,114 B2
(45) Date of Patent: Oct. 10, 2017

(54) METHOD AND DEVICE FOR THE LAYERED PRODUCTION OF THIN VOLUME GRID STACKS, AND BEAM COMBINER FOR A HOLOGRAPHIC DISPLAY

(75) Inventor: Gerald Fuetterer, Dresden (DE)

(73) Assignee: SEEREAL TECHNOLOGIES S.A., Munsbach (LU)

( * ) Notice: Subject to any disclaimer, the term of this patent is extended or adjusted under 35 U.S.C. 154(b) by 510 days.

(21) Appl. No.: 14/124,377

(22) PCT Filed: Jun. 6, 2012

(86) PCT No.: PCT/EP2012/060684
§ 371 (c)(1),
(2), (4) Date: Jan. 17, 2014

(87) PCT Pub. No.: WO2012/168293
PCT Pub. Date: Dec. 13, 2012

(65) Prior Publication Data
US 2014/0126029 A1 May 8, 2014

(30) Foreign Application Priority Data

Jun. 6, 2011 (DE) .................... 10 2011 076 945
Sep. 22, 2011 (DE) .................... 10 2011 051 213
(Continued)

(51) Int. Cl.
*G03H 1/02* (2006.01)
*G03H 1/10* (2006.01)
(Continued)

(52) U.S. Cl.
CPC ..... *G03H 1/0248* (2013.01); *B29D 11/00769* (2013.01); *G02B 5/1857* (2013.01);
(Continued)

(58) Field of Classification Search
CPC .. G03H 1/0248; G03H 1/0402; G03H 1/0465; G03H 1/2645; G03H 1/0011;
(Continued)

(56) References Cited

U.S. PATENT DOCUMENTS 5,153,670 A      10/1992   Jannson et al.
5,367,588 A  *   11/1994   Hill .................... G02B 6/02138
                                                             264/2.6
(Continued)

FOREIGN PATENT DOCUMENTS

EP          1 607 983 A2      12/2005
WO          2010/149588 A1    12/2010

OTHER PUBLICATIONS

Ondax, Inc. Volume Holographic Gratings. Copyright 2005.*
(Continued)

*Primary Examiner* — Bumsuk Won
*Assistant Examiner* — Collin X Beatty
(74) *Attorney, Agent, or Firm* — Saul Ewing Arnstein & Lehr LLP

(57) ABSTRACT

The layered generation of at least one volume grating in a recording medium by way of exposure, the recording medium having at least one photosensitive layer which is sensitized for a presettable wavelength of the exposure light. Each volume grating is generated in the recording medium by at least two wave fronts of coherent light capable of generating interference, the wave fronts being superposed in the recording medium at a presettable depth, at a presettable angle and with a presettable interference contrast. The depth and the thickness of the refractive index modulation and/or transparency modulation of a volume grating in the recording medium is controlled by depth-specific control of the spatial and/or temporal degree of coherence of the interfering wave fronts in the direction of light propagation.

34 Claims, 6 Drawing Sheets

(30) Foreign Application Priority Data

Oct. 12, 2011 (DE) .................. 10 2011 084 379
Feb. 17, 2012 (DE) .................. 10 2012 101 299

(51) Int. Cl.

| | | |
|---|---|---|
| G03H 1/12 | (2006.01) | |
| G02B 5/18 | (2006.01) | |
| G02B 27/42 | (2006.01) | |
| G03H 1/04 | (2006.01) | |
| G03H 1/26 | (2006.01) | |
| B29D 11/00 | (2006.01) | |
| G02B 5/32 | (2006.01) | |
| G02F 1/1334 | (2006.01) | |
| G03H 1/00 | (2006.01) | |
| G03H 1/06 | (2006.01) | |
| G03H 1/20 | (2006.01) | |
| G03H 1/22 | (2006.01) | |
| G03H 1/28 | (2006.01) | |

(52) U.S. Cl.
CPC ........... *G02B 5/32* (2013.01); *G02B 27/4233* (2013.01); *G03H 1/0402* (2013.01); *G03H 1/0465* (2013.01); *G03H 1/2645* (2013.01); G02F 1/13342 (2013.01); G03H 1/0011 (2013.01); G03H 1/0486 (2013.01); G03H 1/06 (2013.01); G03H 1/20 (2013.01); G03H 1/2294 (2013.01); G03H 1/265 (2013.01); G03H 1/28 (2013.01); G03H 2001/005 (2013.01); G03H 2001/0033 (2013.01); G03H 2001/0439 (2013.01); G03H 2001/0467 (2013.01); G03H 2001/264 (2013.01); G03H 2001/266 (2013.01); G03H 2001/2615 (2013.01); G03H 2222/22 (2013.01); G03H 2222/23 (2013.01); G03H 2222/24 (2013.01); G03H 2222/35 (2013.01); G03H 2222/42 (2013.01); G03H 2223/23 (2013.01)

(58) Field of Classification Search
CPC .......... G03H 1/0486; G03H 1/06; G03H 1/20; G03H 1/2294; G03H 1/265; G03H 1/28; G03H 1/202; G03H 1/26; G03H 2001/0033; G03H 2001/005; G03H 2001/0439; G03H 2001/0467; G03H 2001/2615; G03H 2001/265; G03H 2001/266; G03H 2001/0212; G03H 2222/22; G03H 2222/23; G03H 2222/24; G03H 2222/35; G03H 2222/42; G03H 2223/26; G03H 2260/54; B29D 11/00769; G02B 5/1857; G02B 5/32; G02B 27/4233; G02B 27/52; G02B 6/02086; G02B 6/02138; G02B 6/29311; G02B 6/2938; G02F 1/13342; G01L 39/0201; G01L 39/02081; G01L 39/0209; G03F 7/001; G03F 7/70283; G01B 2290/30; G01B 9/0201; G01B 9/02081; G01B 9/0209; G11B 7/0065; G11B 7/127
USPC .......... 359/12, 15, 22, 566, 569, 573; 345/6; 369/103; 385/37
See application file for complete search history.

(56) References Cited

U.S. PATENT DOCUMENTS

| | | | |
|---|---|---|---|
| 5,640,256 A | | 6/1997 | De Vre et al. |
| 6,295,145 B1* | | 9/2001 | Popovich ............ G02F 1/13342 345/7 |
| 6,490,061 B1* | | 12/2002 | Tanaka ................ G03H 1/0248 359/22 |
| RE39,865 E * | | 10/2007 | Hill .............................. 359/566 |
| 7,352,931 B1* | | 4/2008 | Painchaud ......... G02B 6/02138 385/37 |
| 7,792,003 B2 | | 9/2010 | Volodin et al. |
| 2001/0051021 A1* | | 12/2001 | Gaylord .............. G02B 5/1857 385/37 |
| 2003/0210862 A1* | | 11/2003 | Yankov .................. B82Y 20/00 385/37 |
| 2005/0226282 A1* | | 10/2005 | Lawrence ............. G11B 7/127 372/20 |
| 2006/0291022 A1* | | 12/2006 | Redmond ............ G02B 17/023 359/15 |
| 2008/0002209 A1* | | 1/2008 | Yaqoob ............. G01B 9/02004 356/490 |
| 2009/0009668 A1* | | 1/2009 | Tan ..................... G02B 5/3016 349/1 |
| 2009/0201512 A1* | | 8/2009 | Primot ..................... G01J 9/02 356/521 |
| 2010/0027739 A1* | | 2/2010 | Lanza .................... G02B 27/52 378/37 |
| 2010/0099051 A1 | | 4/2010 | Sandstrom et al. |
| 2012/0019884 A1* | | 1/2012 | Volodin .............. G02B 5/1857 359/12 |

OTHER PUBLICATIONS

Rabinovich et al., "Photorefractive Two-Beam Coupling With White Light," Optics Letters, OSA, Optical Society of America, Washington, DC, US, vol. 16, No. 10, May 15, 1991, pp. 708-710, XP000202052.

Denisyuk, "From Lippmann Photography to Selectograms via White Light Holography," Journal of Imaging Scients and Technology, Society of Imaging Science & Technology, Springfield, VA, US, vol. 41, No. 3, May 1, 1997, pp. 205-210, XP000656153.

Ganzherli, "Formation of Three-Dimensional Images When Using Selectograms and Diffraction Gratings," Practical Holography IX, vol. 24-6, Apr. 12, 1995, pp. 357-363, XP55036665.

Abramson et al., "Light-In-Flight Recording 5: Theory of Slowing Down the Faster-Than-Light Motion of the Light Shutter," Applied Optics, Optical Society of America, Washington, DC, vol. 28, No. 4, Feb. 15, 1989, pp. 759-765, XP000001082.

Tsui et al., "Coupled-Wave Analysis of Apodized Volume Gratings," Optics Express, vol. 12, No. 26, Jan. 1, 2004, pp. 6642-6653, XP55034691.

Bramley et al., "Modeling Volume Holograms Using Berreman 4×4 Method," Proceedings of SPIE, Jun. 4, 2001, pp. 282-291, XP055045019.

"20.3 Holograms Formed With Spatially Incoherent Subject Light," Robert J. Collier, Christoph B. Burckhardt, Lawrence H. Lin: "Optical Holography," 1971 Academic Press, pp. 579-582, XP002687602.

Pulsed-Laser Holography, Robert J. Collier, Christoph B. Burckhardt, Lawrence H. Lin: "Optical Holography," 1971 Academic Press, pp. 311-336, XP002687618.

Hotate et al., "Selective Extractionof a Two-Dimensional Optical Image by Synthesis of the Coherence Function," Optics Letters, OSA, Optical Society of America, Washington, DC, vol. 17, No. 21, Nov. 1, 2991, pp. 1529-1531, XP000310755.

Voigtlander et al., "Inscription of High Contrast Volume Bragg Gratings in Fused Silica With Femtosecond Laser Pulses," Applied Physics A., Materials Science & Processing, Springer, Berlin, vol. 102, No. 1, Oct. 19, 2010, pp. 35-38, XP019872346.

Borgsmueller et al., "Computer-Generated Stratified Diffractive Optical Elements," Applied Optics, Optical Society of America, Washington, DC, vol. 42, No. 26, Sep. 10, 2003, pp. 5274-5283, XP000962394.

Yan et al., "Holographic Fabrication of Multiple Layers of Grating Inside Soda-Lime Glass With Femtosecond Laser Pulses," Applied Physics Letters, AIP, American Institute of Physics, vol. 80, No. 9, Mar. 4, 2002, pp. 1508-1510, XP012031688.

(56) References Cited

OTHER PUBLICATIONS

Kawamura et al., "Holographic Writing of Volume-Type Microgratins in Silica Glass by a Single Chirped Laser Pulse," Applied Physics Letters, AIP, American Institute of Physics, vol. 81, No. 6, Aug. 5, 2002, pp. 1137-1139, XP012033189.
De Vre et al., "Analysis of Photorefractive Stratified Volume Hoogrpahic Optical Elements," Journal of the Optical Society of America, vol. 11, No. 9, Sep. 1, 1994, p. 1800, XP055045396.
Yang et al., "Femtosecond Laser Pulse Compression Using Volume Phase Transmission Holograms," Applied Optics, Optical Society of America, Washington, DC, vol. 24, No. 13, Jul. 1, 1985, pp. 2021-2023, XP002145940.
Granger et al., "Multiple Beam Generation Using a Stratified Volume Holographic Grating," Applied Optics, Optical Society of America, Washington, DC, vol. 32, No. 14, May 10, 1993, pp. 2534-2537, XP000367250.
Kostuck et al., "Analysis and Design of Holographic Solar Concentrators", Proc. SPIE, 2008, vol. 7043, pp. 704301-704301-8.
International Search Report, dated Dec. 18, 2012, issued in International Application No. PCT/EP2012/060684.

\* cited by examiner

METHOD AND DEVICE FOR THE LAYERED PRODUCTION OF THIN VOLUME GRID STACKS, AND BEAM COMBINER FOR A HOLOGRAPHIC DISPLAY

CROSS REFERENCE TO RELATED APPLICATIONS

This application claims the priority of PCT/EP2012/060684, filed on Jun. 6, 2012, which claims priority to German Application No. 10 2011 076 945.5, filed Jun. 6, 2011; German Application No. 10 2011 051 213.6, filed Sep. 22, 2011; German Application No. 10 2011 084 379.5, filed Oct. 12, 2011; and German Application No. 10 2012 101 299.7, filed Feb. 17, 2012, the entire contents of each of which are incorporated fully herein by reference.

BACKGROUND OF THE INVENTION

The present invention relates to a method and device for the layered generation of thin volume grating stacks. The present invention further relates to a beam combiner for a holographic display.

Diffractive optical elements (DOE) play a special role in the manufacture of holographic direct-view displays. These elements, which are typically provided in the form of transparent films with presettable thickness, influence the light beams which strike them coming from an image-generating device, such as a large-area light modulator (SLM), through diffraction effects rather than through refraction. This way, the total thickness of the light-beam-influencing elements which are disposed downstream of the SLM in the optical path, seen in the direction of light propagation, and which preferably include light-refracting elements, such as lenses, prisms etc., can be kept very low in contrast to projection displays.

However, the influences which affect the light that is emitted by the pixels of an SLM which are necessary to generate a three-dimensional image sensation in the observer can only be realised by a multitude of film-type DOEs, which are disposed downstream of the SLM in the form of a large-area layer stack, for example. It is also desired for technological reasons in such arrangement that multiple stacked layers are generated in one continuous medium rather than subsequently joining individual films, e.g. by way of gluing. This is because in subsequently joined layer stacks there is the risk that the positions of the individual plane elements in the different layers in relation to each other may change, e.g. through shrinkage.

The structures which are used to influence the direction of the light which is emitted by the pixels of an SLM in a wavelength-specific manner through diffraction effects can be surface gratings or volume gratings. Volume gratings are typically understood to be three-dimensional grating structures which are recorded in a medium which is thick relative to the wavelength of the exposure light. Volume gratings have the advantage that multiple gratings can be generated in layers in a continuous medium, while surface gratings can only be disposed on one or either surface of a recording medium or recording material.

As is known from lithography, three-dimensional structures can be generated in a transparent and photosensitive recording medium, e.g. photoresist, by way of depth-specific focussing of the exposure light for which the recording medium is sensitised. Such a method is described in document US 2010/099051 A1, for example. This way, functionally different structures such as diffraction gratings can be generated step by step in different layers of the recording medium. However, the intensity of the illumination must here be controlled such that it only exceeds the sensitivity threshold of the recording medium in the particular layer.

Since DOEs are preferably diffraction gratings, it makes sense, however, to record the gratings in a single step through interference of two light waves which strike the recording medium at different angles. Such a method is described in document DE 197 04 740 B4, for example, in the context of the manufacture of a holographic display screen, where multiple volume gratings can be generated in different layers of a single recording medium, where said volume gratings can be assigned to light of different wavelengths, or where multiple volume gratings for light of different wavelengths are interleaved in one layer. One challenge is to ensure the capability of generating interference among the two light waves of the exposure light, which is here realised by way of reflection of the incident light beam.

The coherent superposition of a parallel pencil of rays which strikes a photosensitive recording medium at a certain angle and a pencil of rays which is generated at the exit surface of the recording medium by way of total internal reflection is taken advantage of for generating volume grating structures, as described in document U.S. Pat. No. 7,792,003 B2. The recording medium is here disposed next to the exit surface of a pivoted prism, where the angle at which the pencils of rays interfere is presettable through the rotation of the prism. This ensures a continuously variable control of the diffraction efficiency of the volume grating depending on the wavelength of the diffracted light. In addition, the structure of the generated volume grating can be influenced by rotating the prism during the recording such that the diffraction efficiency has the same high value for multiple wavelengths, so that it resembles a rectangular function. Other volume grating profiles can be generated through reflection of the incident exposure light wave at a profiled surface, which can in this case convert an incident parallel pencil of rays into a convergent or divergent pencil of rays, for example. However, one problem is to generate the volume gratings in a large-area recording medium, because the surface area of the recording medium is determined by the exit area of the prism.

When recording volume gratings, great importance is attached to the issue of depth-specific apodisation of these gratings, that is the longitudinal modulation or shape of the refractive index profile in the Z dimension (i.e. perpendicular to the surface of the recording medium, for example, or, more general, along the direction of propagation of the wave field which is used for the reconstruction), in addition to the modulation in the X and/or Y dimension, i.e. parallel to the surface of the recording medium, for example. This method allows volume gratings to be recorded which when diffracting light waves specifically suppress side peaks of the diffracted order, for example, and which, more generally, show controllable angular and wavelength selectivity. Such a method is described in the publication "Coupled-wave analysis of apodized volume gratings" by J. M. Tsui et al., Optics Express, Vol. 12, No. 26, pp. 6642, where in a recording medium made of photosensitive glass the refractive index modulation which is available for subsequent coherent illumination is depth-specifically reduced by way of preliminary exposure with incoherent light of reduced penetration depth from either of the two outer surfaces such that the envelope of the refractive index modulation in the Z dimension shows a Gaussian profile, for example, in very rough estimation during the coherent illumination.

A thus recorded volume grating is then superposed by this absorption profile, which is for example generated by short-wave UV radiation, as an apodisation function in the Z dimension. However, this absorption approach does not allow multiple thin volume grating layers to be given respective longitudinal apodisation profiles in a thick recording medium. This method, which illustrates the prior art, only allows apodisation functions to be generated which have been generated by single- or double-sided absorption profiles which are proportional to $I_0 xe^{-\alpha z}$, where $\alpha$ is the absorption coefficient of the wavelength used for incoherent preliminary exposure, which is a short-wave UV radiation, for example. Exponentially decreasing functions only are thus availably as apodisation functions for the refractive index modulation. Consequently, the range of generatable apodisation profiles is limited to few functions, which are continuously decreasing from the outer surface of the recording medium inwards. Moreover, different wavelengths must be provided with different absorption coefficients to be able to generate anything more than a simple apodisation profile by way of preliminary exposure.

SUMMARY OF THE INVENTION

Now, it is thus the object of the present invention to provide a method and a device for the generation of volume gratings at a presettable depth of large-area recording media, thereby either generating a grating stack of multiple gratings with different angular and/or wavelength selectivity in a single recording medium or superposing multiple volume gratings with different angular and/or wavelength selectivity at a presettable depth of the recording medium. Moreover, it is desired to provide the possibility to specifically influence the angle- and/or wavelength-specific diffraction efficiency through different apodisation profiles of the generatable grating structures.

This object is solved according to this invention by the features of claim 1. Further preferred embodiments and continuations of the present invention are defined in the dependent claims.

The method according to this invention serves for the layered generation of at least one volume grating in a recording medium by way of exposure. The recording medium has at least one photosensitive layer which is sensitised for a presettable wavelength range which includes the wavelength of the exposure light. Each volume grating is generated in the recording medium by at least two wave fronts which are capable of generating interference, generally wave fields, of at least partially coherent light, in that said wave fields interfere in the recording medium at a presettable depth, at a presettable angle and with a presettable interference contrast. The depth and thickness of the refractive index modulation and/or transparency modulation of a volume grating in the recording medium is influenced in the direction of light propagation by way of depth-specific control of the spatial and/or temporal degree of coherence of the interfering wave fronts.

Owing to the fact that at least two wave fronts of coherent light which are capable of generating interference interfere in the recording medium at a presettable depth, at a presettable angle and with a presettable interference contrast, and that, consequently—on temporal average if applicable—a light intensity which is sufficient for exposure of the recording medium is realised in the region of the presettable interference contrast, it is possible according to this invention to record one or multiple volume gratings only at the presettable depth of the recording medium. A depth-specific control of the spatial and/or temporal degree of coherence of the interfering wave fronts is here achieved, for example, by way of controlling the properties of the exposure light.

The method according to this invention can particularly preferably be applied where the recording medium shows a fluctuating surface profile or thickness. For example, such fluctuations can be caused in the generation of the recording medium, e.g. if it is a photopolymer or dichromate gelatine (DCG). When the volume grating is buried in the depth of the recording medium, surface unevenness does neither affect the grating as such nor the process of recording the volume grating, provided the grating is recorded from the smooth side of the recording medium, that is the one which is attached to a substrate with even surface, for example. The surface profile on the other side of the recording medium can then be leveled during the reconstruction, i.e. during usage of the volume grating, through immersion, for example by an oil film or adhesive material with adapted refractive index, which forms the material that joins a subsequent layer with a smooth surface. Alternatively, an uneven surface profile can be compressed somewhat by an adjacent layer with smooth surface such that it turns into a near-surface refractive index profile which, however, does not affect then recording process thanks to the buried exposure of the volume grating from the other side, which is even and shows a homogeneous refractive index. In this case of a surface profile that is leveled through pressure, de-lamination and embedding by way of immersion is preferred before the volume grating is used.

For example, a transmissive volume grating can be recorded in a recording medium in that two wave fields, which come from one side, namely the flawless, smooth side, cross in that medium, but are only superposed such to generate constructive interference in a presettable volume, namely in a preset depth range $\Delta z$. For example, this depth range can also be chosen by modifying the spatial and/or temporal coherence of the interfering wave fields accordingly such that no interference pattern is recorded in those volume regions of the recording medium which are flawed, i.e. which show a modulation of the refractive index profile or a modulation of the surface profile, for example. In other words, the influence of a near-surface defect can be eliminated during the recording of a holographic optical element. This is particularly preferable where recording media are used which cannot be embedded by way of immersion once they are sensitised. It is possible, for example, that chemical components of the recording media react with immersion liquids or adhesives, so that the recording media become inoperative. After exposure and possibly following further processing of the recording media, the use of immersion liquids or adhesives is usually unproblematic, that is, for example, because a possibly occurring chemical reaction of an optical adhesive with the chemical sensitisation system of the recording medium only takes place after the recording.

Possible embodiments include photopolymers, photoresists and other recording media which are applied to substrates by way of centrifugal or spray coating and which only have a smooth surface on the side facing the substrate. Such recording media can be exposed with the disclosed method from the substrate side, while the deformed surface side of the recording medium is only illuminated with an incoherent constant light portion, which can also be substantially below the reaction threshold of the medium. It does not have to, though. If a photoresist is used, the ratio of constant light portion and reaction threshold of the medium can be chosen depending on whether a positive or negative photoresist is used, for example. It is thus possible, for example, to record a grating that is apodised perpendicular to the substrate surface in a photoresist and, in the photoresist developing process, to erode the photoresist from the defective surface side (which was flawed during a centrifugal coating process, for example) such that the apodised grating remains on the substrate. A great variety of possible apodisation functions is realised by choosing a photoresist which does not react binarily on the exposure dose.

In contrast to the methods which represent the prior art, according to an embodiment of the present invention, the volume gratings can be generated through interference of two wave fields which are diffraction orders of one wave field which is diffracted at a master grating. Once they have passed through the master grating, the diffracted wave fields interfere with an interference contrast which is a function of the distance to the master grating. This interference contrast is determined by the coherence properties of the wave field of the exposure light which illuminates the master grating. These properties, which are represented by the spatial and/or temporal coherence function of the exposure light, are determined by the properties of the light source. They depend on the spectral distribution of the light source and on the shape of the light source, i.e. whether it is a point light source or a incoherent surface light source with complex transparency function in the form of an amplitude and/or phase grating. In contrast to the prior art, the lateral extent of the recording medium and thus that of the volume gratings is thus substantially determined by the lateral extent of the master grating and by its optical arrangement in relation to its illumination.

Downstream of the master grating, which is illuminated by a light source with a substantially collimated wave field, there is a relative lateral offset s(z) (shear) in the direction of light propagation between those wave fields propagating further downstream which are not diffracted at the master grating and those which are diffracted, said shear causing a presettable depth-dependent profile of the interference contrast V(z) of the interfering wave fields thanks to a preset complex-valued spatial and/or temporal coherence function $\Gamma$ of the illuminating wave field.

The squared absolute value of the wave fronts which are diffracted at the master grating and which are interfering represents an luminous intensity value which causes a change in the transparency and/or refractive index in the region of a photosensitive recording medium that is disposed downstream of the master grating in the direction of light propagation in which the luminous intensity exceeds the sensitivity threshold, thereby generating a volume grating that affects the amplitude and/or phase of the light.

However, the recording medium must be of such nature that this grating can be fixed permanently in a physical process.

For this reason, typically used recording media are, for example, photopolymers which include a photosensitive initiator which triggers the photo-polymerisation process.

However, there are applications where non-fixed, dynamically and fast changing apodised gratings, or interference patterns, can preferably be used. For example, any kind of wave fields, including ultrasonic wave fields, for example, can be superposed as described above, so that apodised ultrasonic interference patterns, i.e. ultrasound gratings, can be generated which can be reconstructed optically or with the help of ultrasonic waves with a presettable angular and/or wavelength selectivity and which can be changed at a fast pace.

The capability of generating interference of the two superposed wave fronts is ensured due to the fact that they represent different diffraction orders of one collimated wave field that is emitted by the light source and diffracted at the master grating, which is disposed upstream of the recording medium, seen in the direction of light propagation, said wave field having a presettable spatial and/or temporal coherence. It is thereby possible to generate a defined exposure light distribution with an optical path that is of relatively simple design.

In addition to a mask with a generally complex-valued function, a statistical scattering element, for example a rotating diffusing plate, is disposed in the plane of the light source, said element de-correlating the phase values of the spatial distribution in the plane of the light source.

The interference contrast V(z) at a certain depth of the recording medium depends on a lateral offset s(z) (shear) of the two interfering wave fronts, which is a function of the coordinate in the direction of propagation of the wave fields. The presettable profile of the interference contrast V(z) which is generated in a presettable depth region of the recording medium is a function of the shape of the amplitude and/or phase grating which is situated in the plane of the light source. In this context, the lateral offset s(z) (shear) is understood in particular such that the wave fields which are diffracted at the master grating, including the non-diffracted portion of the zeroth diffraction order, propagate at different angles, so that they are increasingly offset laterally relative to each other as the distance z grows. Different diffraction orders show different mutual shear.

Thanks to the interference contrast V(z) that is present at the presettable depth of the recording medium, volume gratings can be generated in the recording medium in the form of a presettable refractive index and/or transparency modulation which corresponds with an apodisation function n1(z) which allows the angular and/or wavelength selectivity of the volume gratings to be controlled in a presettable way and any side peaks of the angular and/or wavelength selectivity of the volume gratings to be suppressed in a presettable way. The apodisation function n1(z) corresponds with the envelope of the refractive index modulation. The interference pattern, which has a high spatial frequency of $1/0.5\ \mu m^{-1}$, for example, is modulated with one or multiple substantially lower spatial frequencies, i.e. with $1/5\ \mu m^{-1}$, for example.

This means that the shape of the gratings can be modified by choosing the properties of the exposure light such that they have preset diffraction properties as regards their directional and/or wavelength selectivity.

In a transmissive volume grating which was generated by way of exposure of a homogeneous recording medium to two mutually coherent plane waves, the envelope of the refractive index modulation is a rectangular function, neglecting any absorption in the recording medium. In this case of classic exposure of a volume grating, the angular and/or wavelength selectivity of the diffraction efficiency has the shape of a squared sinc function.

The coherence properties, which are modified compared with a classic exposure of a volume grating, are preferably generated in that the plane of a light source which is to be collimated and which illuminates the master grating has a complex-valued optical transparency function which represents an amplitude and/or phase grating, an amplitude and/or phase distribution, an amplitude and/or phase grating which is superposed by an apodisation function, or an amplitude and/or phase distribution which is superposed by an apodisation function.

If the angular selectivity $\eta(\Theta)$ and/or wavelength selectivity $\eta(\lambda)$ are to be given a presettable profile, then the amplitude and/or phase function of the slits of the grating which is disposed in the plane of the light source must be chosen to have such a shape that said profiles are realised, i.e. that they have the same shape themselves, for example.

If the envelope of the refractive index modulation n1(z) is a rectangular function, for example, then the angular selectivity η(Θ) and/or the wavelength selectivity η(λ) have a profile which corresponds with the squared sinc function. This function is the squared absolute value of the Fourier transform of a rectangular function.

Even though the spatial coherence and thus the envelope of the interference pattern is defined by the Fourier transform of the single slit of a grating which is disposed in the plane of the light source, and even though the angular or wavelength selectivity is proportional to the Fourier transform of the envelope of the refractive index modulation n1(z) and thus proportional to the—generally complex—transmittance function of the individual slits in the plane of the light source itself, it is generally not possible to calculate the assignment precisely just through Fourier transformations.

It is possible, for example, to perform a correction taking into account a present higher numerical aperture NA, an absorption in the recording medium, a transfer function for converting an exposure dose into a refractive index shift for the present recording medium and present recording geometry, i.e. to get a respective interpretation of the generally complex-valued transmittance function in the plane of the light source. It is thus possible, for example, to choose specific transfer functions for individual slits of the light source in order to optimise the angular and/or wavelength selectivity of the volume grating to be recorded.

In transmissive and/or reflective volume gratings, the envelope of the refractive index modulation can also have the shape of a Gaussian distribution, of a Hamming window or of a Kaiser-Bessel window. This leads to a significant reduction of the side peaks of the angular and/or wavelength selectivity.

This is preferable, for example, if angular and/or wavelength selectivity of different reconstruction geometries lie close to each other. It is thus avoided that ghost images appear in the represented object space caused by side peaks of the angular and/or wavelength selectivity.

In transmissive and/or reflective volume gratings, the envelope of the refractive index modulation can be shaped specifically by choosing the coherence of the wave fields used for exposure accordingly.

Consequently, the following relations apply between a complex amplitude and/or phase grating which is disposed in the plane of the light source and the interference contrast V(z) downstream of the master grating:

The depth z of the interference contrast V(z) is determined by the grating period;
The width of the function V(z) is determined by the number of grating periods;
And the shape of the function V(z) is determined by the shape of an individual grating period of the amplitude and/or phase grating which is disposed in the plane of the light source.

It can thus be achieved that the shape of the angular and/or wavelength selectivity of the volume gratings which can be generated at a presettable depth can be set through the presettable profile of a refractive index modulation n1(z) in the direction of light propagation, said profile being an apodisation function with the shape of a squared sinc, squared cosine, squared Gaussian or a squared approximated rectangular function.

This profile corresponds directly with the amplitude and/or phase profile of the grating which is disposed in the plane of the light source.

If the recording medium has a linear transfer function, then the profile of the refractive index modulation n1(z) corresponds with the profile of the interference contrast V(z) in the region in which a volume grating is to be recorded. If the transfer function of the recording medium is non-linear, then the interference contrast V(z) must be modified accordingly in order to get a refractive index modulation n1(z) which corresponds, for example, with the absolute value or squared absolute value of a sinc function.

Possible preferred embodiments of the apodisation functions n1(z) are, for example, proportional to the function $\sin(a(z-z0))/(a(z-z0))^{(n/m)}$, where the modulation depends on the absolute value, squared absolute value or exponentiation n/m (n, m being integers) of the sinc function or on $\sin(a(z-z0))/(a(z-z0))$ and the phase position is chosen depending on the sign of $\sin(a(z-z0))/(a(z-z0))$.

This means that the modulation of the refractive index is zero at the zero points of the sinc function and that the phase of dielectric layers is chosen to be shifted by π—or half a period—in the range of negative values of the sinc function, compared with the ranges of positive values of the sinc function. This preferred embodiment can be applied to transmissive volume gratings, reflective volume gratings and to dielectric layer stacks, for example.

The precise correlation of the envelope of the interference contrast V(z) in the recording medium, which serves as apodisation function n1(z), and the complex-valued masking of a monochromatic field distribution, for example, in the plane of the light source LS $a(x,y)*e^{i\phi(x,y)}$ depends on the actually used optical system and thus also on the numerical aperture NA of the optical illumination system, for example. In the case of a high numerical aperture NA, the functions $a(x,y)*e^{i\phi(x,y)}$ and n1(z) do no longer correspond through a Fourier transformation FT, for example. Generally, n1(z) results from the diffraction pattern of the non-phase-decorrelated light source LS in the plane of the recording medium. In the case of a spectrally broadband light source LS this applies analogously in the form of a superposition of individual spectral lines.

The apodisation function which is used during the exposure of a volume grating can be chosen such that it compensates the influence of the effective absorption along the depth z in the recording medium, and thus the drift of the present z-dependent beam ratio, and thus the drift of the present z-dependent interference contrast that is caused by absorption.

The angular selectivity of the volume gratings which are generatable at a presettable depth is, however, also controllable by varying the thickness of the particular volume grating to be generated.

This is a general property of volume gratings, and it means that the angular range of the diffracted portions of the 'usable' light diffracted at this grating becomes the smaller the thicker the volume grating is in the direction of light propagation.

The recording medium must have a presettable thickness in order to be able to record two volume gratings, for example, in the recording medium by way of exposure, said gratings being disposed one after another or interleaved, seen in the direction of light propagation, i.e. along the Z coordinate. This means that volume gratings which differ in their properties can also be recorded in an interleaved manner, so to generate two volume gratings serving two different light wavelengths, for example. In this context, the direction of light propagation is defined to be either the direction of propagation of a single wave front or the resultant direction of propagation of interfering wave fronts of the light (exposure light or useful light).

The volume gratings which are generatable at a presettable depth can be designed for a presettable light wavelength and therefore preferably only influence light of this wavelength by way of diffraction.

There is thus a direct relation between the geometry of the volume grating and the light wavelength to which the grating reacts by way of diffraction. Other wavelengths are suppressed or not influenced by the volume grating.

The depth apodisation and/or depth separation of the intensity modulation of the exposure light in the recording medium can be controlled dynamically in the method according to this invention.

This possibility is due to the fact that both properties depend directly on the shape of the grating which is disposed in the plane of the light source, and which can be modified in its amplitude and/or phase properties during the recording process. This can also be done periodically, for example with the help of a moving phase plate which is disposed in the optical path.

The profile of the refractive index modulation of the volume grating in the recording medium can be determined by a presettable static or dynamic adjustment of the complex amplitude in the plane of the light source.

In a preferred embodiment, the master grating is provided in the form of a surface profile grating whose illuminated surface is either a part of the surface of the recording medium of the volume grating or which coincides with the latter.

In another preferred embodiment, the master grating is designed in the form of a volume grating. This also has the advantage that only a zeroth and one higher diffraction order will be generated in the optical path downstream of the master grating, for example, if the grating period is relatively large compared with the wavelength of the light that strikes the grating.

One feature of the method according to this invention is that it allows volume gratings to be generated in large-area recording media. One the one hand, this is owed to the fact that the master grating which is required for illumination with light that is capable of generating interference can be made in the form of a surface profile grating of substantially the same size. It is, however, also possible to generate the large-area volume grating by joining smaller master gratings in two dimensions (tiling). This way, it is possible, for example, to realise large-area coherent-optical filters for a holographic direct-view display having an image diagonal of 20" or more, for example.

The in-phase joining of gratings, i.e. quasi a continuous extension of the grating period, represents an extension of the inventive method. This can be done, for example, with the help of the diffraction pattern which does not show any phase shift in the tiled grating if the grating is tiled in-phase. A phase shift in grating segments which are joined out of phase becomes visible as a sharp dark line in the diffraction pattern, for example. The overlapping region between two illuminated grating segments is uniformly illuminated by half, for example.

Non-symmetrical profiles of the interference contrast or refractive index modulation in the recording medium can be generated in that an asymmetry of the phase and/or amplitude distribution is introduced in the plane of the light source.

This possibility results from the direct correspondence of the phase and/or amplitude distribution in the plane of the light source and the profile of the refractive index modulation in the direction of light propagation in the recording medium. A presettable asymmetrical profile of the interference contrast or refractive index modulation in the recording medium can be provided in order to suppress higher diffraction orders of the useful light, for example, as required by the specific application.

It is thus possible, for example, to use a saw-tooth-shaped surface profile phase grating in the plane of the light source to generate the asymmetry.

As an alternative to using the interferences of the $0^{th}$ and $1^{st}$ diffraction order, for example, of the diffraction at the surface profile grating, it is also possible to use interferences of the $0^{th}$ and $2^{nd}$ diffraction order or other diffraction orders to generate the volume grating in the recording medium.

This is achieved through a special design of the master grating in that the diffraction efficiency of the particular diffraction order is maximised while that of the other diffraction orders is minimised.

The recording medium can also have an initiator, where a constant light portion of the exposure light can be used for activation or deactivation of the initiator of the recording medium.

An example of such a medium is photo-thermo-refractive (PTR) glass, where by way of preliminary exposure of either surface to LTV radiation a Gaussian refractive index profile can be generated in the direction of light propagation prior to the recording of the volume grating.

However, the recording medium can also be an optically or electrically controllable material to be able to generate switchable volume gratings.

Suitable media include LC layers, for example. This provides the possibility to control the diffraction efficiency of the volume gratings by changing the applied voltage.

Various reconstruction geometries (plane wave/plane wave, plane wave/spherical wave and others) can be realised in a presettable fix or switchable form through diffraction at the generatable volume gratings.

It is thus possible, for example, to generate a volume grating which converts a plane wave into a convergent spherical wave, and which thus shows the effect of a field lens. Such a field lens can be used in an autostereoscopic or holographic display, for example. If one or more further volume gratings can be recorded or generated in the recording medium with the method according to this invention in order to achieve further optical functions, then the exposed recording medium can realise multiple optical functions and be integrated as a single component into such a display.

During the recording of the volume gratings in the recording medium, reflections can be suppressed through a presettable choice of the spatial and/or temporal coherence properties of the exposure light. This does not actually prevent reflections during the recording, but thanks to this measure the reflected portions can no longer interfere constructively with non-reflected portions, so that the sensitivity threshold for the exposure of the recording medium is thereby not exceeded.

The recording of a volume grating with preset shape and thickness at a specified depth of the recording medium can also be achieved through chemical or optical depletion of the initiator in the recording medium from the surfaces inwards.

In contrast to the method according to this invention, this method is less flexible, because the chemical depletion can be realised technically from one surface of the recording medium only, for example. Consequently, this method generally allows a single grating to be recorded only, namely that which is situated right beneath the surface of the recording medium in this example.

Forming an extension of the patent, the optical depletion of the initiator in the recording medium can be achieved, for example, by way of illumination with light whose spatial coherence has been modified such that there is no or only little coherence, i.e. a low interference contrast V(z), in a layer in the centre of the illumination means, for example. Since there are photopolymers which require activation energy, the intensity which is raised locally by a factor of 4, for example, compared with the intensity of the constant light portion of the exposure light, can be used to deplete the initiator locally in this layer. If the exposure light is given a phase shift that is as statistical as possible, then no grating structure will be recorded in the recording medium, but the concentration of the initiator will be depleted. For example, in a central depth range of the recording medium, an initiator concentration will remain which can be used to record a volume grating. This volume grating then has an effective layer thickness which is substantially lower than the thickness of the recording medium. This method can also be used to generate a preset angular and/or wavelength selectivity which does not show any higher diffraction orders, for example.

Another possibility of limiting the thickness of a volume grating to a fraction of the layer thickness of the recording medium is based on the spectral distribution $I(\lambda)$, i.e. on the temporal coherence of the light source.

In the same way as through a presettable design of the absolute value of the spatial coherence $|\mu 12(s)|$ and a presettable lateral offset of two wave fronts which are capable of generating interference, as described above, it is also possible to generate presettable narrow regions with a high interference contrast V(z) and specifically adjusted profiles of the envelope of the interference contrast V(z) in the Z dimension through temporal coherence and a presettable longitudinal offset of two interfering wave fronts.

Of course, these and other interference patterns, which are generated based on the absolute value of the spatial coherence $|\mu 12(s)|$, for example, or a combination of tailored spatial and temporal coherence, can also be used to deplete an initiator in the recording medium or to activate an initiator for subsequent exposure, i.e. to supply it with the necessary activation energy.

As is known from a Michelson white light interferometer, coherence will only be achieved if the lengths of the optical paths of the two interferometer beams are balanced to differ by less than 3 µm, i.e. if the optical path difference (OPD) is ≤3 µm, owing to the great spectral width of white light.

If one of the interfering wave fronts is tilted relative to the other one, while the path lengths of the two paths are carefully equalised, it can be seen in the white light interferometer that the interference contrast shows a peak and that the interference contrast decreases sideways around the intersecting line of OPD=0 the more steeply the greater the tilt is. This is caused by the fact that a tilt effects a change in the local optical path difference. This effect is taken advantage of, for example, to determine the spectral density $S(\lambda)$ of a light source, because the latter results from the Fourier transform of the oscillating signal portion.

This also means that in the case of conventional two-beam interference, which is used for the exposure of DOEs, for example, and which is recorded in a recording medium in the form of a volume grating, for example, but which is based, in contrast to that, on sufficiently spectrally wide radiation, an apodisation can be introduced in the Z dimension, which, unfortunately, also affects the X-Y plane at the same time. In other words, this means that, for example, a conventional two-beam interference—under a relative tilt of the two wave fronts of 60°—whose sufficiently high interference contrast V(z) shall be limited in depth, i.e. in the Z dimension, to 10 µm, for example, and which has a sufficiently large spectral bandwidth, also causes the interference pattern to be limited to a size of ±6 µm both lateral and perpendicular to the tilt axis. This method is thus only applicable for volume gratings with little lateral extent. The object of this invention was, however, to generate volume gratings having the size of a display, e.g. of a 20" screen.

The lateral extent of the region with sufficiently high capability of generating interference can be substantially enlarged, however, even if the radiation used for illumination has a great spectral width.

In order to enlarge the lateral extent of the region having a high interference contrast while keeping the extent of the region having a high interference contrast V(z) small in depth, i.e. in the Z dimension, there are at least two possibilities, or any possibility which is suitable to generate interference patterns with radiation of little temporal coherence.

A rather simple possibility is to generate a reflective hologram with the help of an incident wave front and a mirror that reflects the wave front, where the mirror shall be positioned as close to the layer of the recording medium as possible. This method is described in document U.S. Pat. No. 7,792,003 B2. The resultant envelope of the interference pattern, and thus the apodisation function of the refractive index modulation n1(z), is proportional to a half sinc function. Document U.S. Pat. No. 7,792,003 B2 teaches, however, that it is necessary to combine two reflective holograms each showing a half sinc-shaped refractive index modulation, i.e. to combine two reflective holograms each being recorded with half sinc-shaped interference contrast, to get the desired near-rectangular wavelength selectivity of the combined grating (see document U.S. Pat. No. 7,792,003 B2, FIGS. 5A-5D).

Even if the angle of the two interfering wave fronts is rather large, using a mirror allows to give the interference contrast a relatively large lateral extent, namely a lateral extent whose size can be preset in a recording medium which is attached directly to the mirror, or which is disposed on a reflective carrier film, for example. This is based on the fact that the optical path difference between the interfering wave fronts at the reflective surface is always zero. In the depth, i.e. in the Z dimension, the optical path difference between incident and reflected wave front becomes the greater the larger the angle of incidence and thus the angle of reflection are. This means that only a very limited selection of longitudinal distribution functions of the interference contrast V(z) are generatable using the method described in document U.S. Pat. No. 7,792,003 B2. Moreover, the reconstruction geometry is limited to Bragg grating planes which are parallel to the reflective surface, because angle of incidence and angle of reflection of the interfering wave fronts are identical.

However, there are a number of possibilities to minimise the limitations of document U.S. Pat. No. 7,792,003 B2 to a large extent. One possible extension is to use a periodicity of the spectral density $S(\lambda)$ of the light source. It causes a periodicity of the temporal coherence, i.e. a beat whose period and profile can be set in a presettable way. This is based on the Wiener-Khinchin theorem. The distance between mirror and recording medium, for example, can thus be chosen in a presettable way such that it is not the half sinc function of the interference contrast, for example, which is present right on the mirror surface that is recorded but rather the following portion of the beat, i.e. a full sinc function, for example. Two slightly differing spectral ranges of the light source are used to generate this beat, for example. This reduces the number of process steps and makes redundant the difficult task to combine two volume gratings in-phase, i.e. without modulo $2\pi$ phase shift, as would be necessary when recording two half sinc functions, for example.

A depth apodisation of the refractive index distribution $n1(z)$ in the recording medium is possible using a beat function of the temporal coherence. The beat frequency is determined by the distance of the at least slightly separated spectral ranges of the light source used (for example two, but typically more spectral ranges). The envelope of the beat is determined by the shape of the sections of the spectral distribution of the light source. It is possible, for example, to use two slightly separated rect functions as sections, but also two slightly separated Gaussian functions to determine, i.e. to define in a presettable way, the profile of the depth apodisation of the refractive index distribution $n1(z)$.

A further possible extension is based on direction-specific reflection of the wave front used for recording, which can be generated with the help of reflective holograms, for example. This can be surface profile gratings or volume gratings, for example, which are designed to show maximum reflection of one diffraction order only, for example. It is also possible, however, to use reflective liquid crystal gratings, which makes for a highly flexible exposure set-up. The limitation that the angle of incidence is identical with the angle of reflection can thus be overcome. The reconstruction geometry of the generated volume gratings is thus no longer limited to Bragg grating planes which lie parallel to the reflective surface.

Having in mind the simple reconstruction geometry of a reflective volume grating where the angle of incidence is identical with the angle of reflection, which greatly limits the design freedom, the full reconstruction geometry parameter range of reflective volume gratings can be opened up when this limitation is annulated, where it becomes possible to reduce the thickness of the recorded volume grating to a fraction of the thickness of the recording medium, to choose a particular Z plane in the recording medium and to choose a certain depth apodisation profile of the refractive index distribution $n1(z)$ by using the temporal coherence properties of the exposure light.

Many transformations of a complex wave field into another complex wave field, such as, for example, the realisation of a combined field lens with on-axis effect, said lens comprising a first transmissive volume grating, which transforms an on-axis plane wave into an off-axis plane wave, and a second transmissive volume grating, which transforms an off-axis plane wave into an on-axis spherical wave, can be implemented well in the sandwich design of flat holographic 3D displays in the form of transmissive volume gratings, which is easier than fitting reflective volume gratings into the arrangement. The realisation of transmissive volume gratings which provides the possibility to reduce the thickness of the volume grating to a fraction of the thickness of the recording medium, to choose a particular Z plane in the recording medium and to choose a certain depth apodisation profile of the refractive index distribution $n1(z)$ is thus preferred to reflective volume gratings.

Moreover, transmissive volume gratings can be reproduced easily using a master grating. These can be surface profile gratings, for example, such as DOEs, blazed gratings, binary phase gratings, multi-stage phase gratings, sub-1 phase gratings, such as those with variable duty factor and fix web widths or fix groove widths, for example. Controllable gratings, such as polarisation-dependent liquid crystal gratings (PDLCG), which are multi-layer arrangements which can 'select' a set of angles, or LCG as described in document WO 2010/149587, which can generate continuously varying diffraction angles, where the diffraction efficiency is about 0.5, for example, and where there are preferably only two diffraction orders, are suited for flexible geometries, for example.

Volume gratings can serve as master gratings for replication, for example. If two-beam interference patterns are to be transmitted, the volume gratings can easily be designed to have a diffraction efficiency which makes for a sufficient interference contrast in the recording medium. The diffraction efficiency of the master volume grating can be designed to lie between $\eta=0.4$ to $\eta=0.6$, for example.

Depending on the distance z, two parameters of the wave fronts of the $0^{th}$ and $1^{st}$ diffraction order, for example, change downstream of the master grating G that is used for replication, namely the absolute value of the lateral offset $s(z)$ (shear) and the absolute value of the longitudinal offset $OPD(z)$, which can be used to realise the desired depth apodisation of the refractive index distribution $n1(z)$.

To get an interference contrast, which depends on the absolute value of the longitudinal offset $OPD(z)$, that is suitable to satisfy the requirements of a particular exposure set-up, a particularly tailored spectral filter must be used. Spectral filters can be metal interference filters (MIF), transmissive or reflective dielectric layer stacks, fix or variable Fabry-Perot interference filters, reflective or transmissive volume gratings and modified spectrometers, to name just a few examples.

For example, a very flexible spectral filter can be realised as follows: A grating spectrometer is used to widen the light of a light source separated spectrally. This can be done, for example, in that a spectral range of 100 nm, 10 nm or 1 nm is separated spectrally in a target plane such to have a size of 10 mm, i.e. that it is expanded. In a spectrometer, this plane is identical with the plane which generally hosts a photo detector which records the intensity distribution which corresponds with a spectral distribution. Further, a fix or variable intensity filter can be disposed in this plane. For example, an SLM, which also includes a digital micromirror device (DMD), can be used to specifically modulate individual spectral ranges, i.e. vary the spectral density $S(\lambda)$. It is further known from practical pulse forming applications, i.e. forming of short laser pulses, to use a spectrally assigned phase-modulating SLM. Generally, the spectrally separated light of a light source illuminates a complex-valued SLM.

Analogously to what has been said for the generation of reflective volume gratings with variable depth apodisation, the distance between master grating and layer of the recording medium can be chosen to be large enough to avoid half sinc or Gaussian functions and to specifically use the second or further beat segment to expose symmetrical apodisation functions. By choosing the spectral section of the exposure light, it is also possible, for example, to generate between two regions which are characterised by a symmetrical apodisation function a sufficiently large region which is characterised by a sufficiently low interference contrast $V(z)$, which always lies below the activation energy of the recording medium, for example, given the exposure time is chosen accordingly. It is thus also possible to record individual volume gratings whose Z dimension is always limited to 10

μm, for example, one after another on different depth levels in a recording medium which is 100 μm thick, for example.

Although using the absolute value of the spatial coherence |μ12(s)| to generate depth-separated and/or depth-apodised volume gratings is less complicated, taking advantage of the temporal coherence properties over the spectral distribution I(λ) of the light source forms an alternative way of implementation. Moreover, the variety of generatable volume gratings can be enlarged if both methods—spatial and temporal coherence—are combined.

A possible application of the method described above is a beam combiner which includes a recording medium with at least two volume gratings with presettable thickness and which serves to superpose the light which is emitted by pixels of a light modulator. Such a beam combiner is a major component in the realisation of a holographic direct-view display with large image diagonal, for example. The functional principle and fields of application of such a beam combiner are disclosed in document WO 2010/149588 A1, for example, so that the embodiments detailed there can be realised to apply such a beam combiner in a holographic direct-view display. Insofar, reference is made in this respect to document WO 2010/149588 A1.

The volume gratings which are generated in the way described above exhibit an angular selectivity whose width and, optionally, profile are presettable. This is necessary in particular to suppress higher diffraction orders and to let only light of a certain diffraction order pass to the eyes of the observer, when the beam combiner is used in a direct-view display.

A specific embodiment of a beam combiner comprises a layer stack of six volume gratings, each having a presettable thickness, and an intermediate layer with a different presettable thickness, for example. This is shown in FIGS. 6 to 8 and 10 in document WO 2010/149588 A1, for example, where, of course, the volume gratings Vg1, Vg2, Vg3 and Vg4, which are provided there, can be recorded in one recording medium.

With such an arrangement, the light beams which are emitted by the RGB pixels of a light modulator can be combined in one light beam, for example, which is required for two-phase encoding of complex values in a phase-modulating light modulator, for example, as described in document WO 2010/149588 A1 too.

The overall thickness of the volume grating stack should not exceed a preset value if an aperture stop is disposed downstream of the beam combiner, seen in the direction of light propagation.

Otherwise this would cause a loss of light since the light beams which are emitted by the beam combiner diverge, so that they would be blanked out partly by the aperture stop.

This way, an angle tolerance of a reconstruction geometry of <0.1° can be maintained for all the three primary colours (RGB) and all the six volume gratings of the beam combiner by adequately designing the volume gratings and superposing apodisation functions. This angle tolerance is of particular importance when applying such optical elements in holographic display devices.

Another possible application of the method described above relates to a solar panel having a hologram component and an energy conversion device that converts sunlight into electric power, where the hologram component comprises a recording medium and at least two volume gratings and where the hologram component is designed and arranged at the solar panel such that sunlight is guidable towards the energy conversion device even if the sunlight that strikes the solar panel comes from different directions.

Volume grating stacks which comprise multiple recording media which are arranged one atop the other and each of which comprising one volume grating are used in the prior art in conjunction with solar cells to modify the angular and/or wavelength spectrum of the incident sunlight with the purpose of increasing the efficiency of solar panels. A solar panel with two volume gratings which are arranged one atop the other which diffract the short- and long-wave portions into two different directions, namely towards solar cells with different spectral sensitivity is described in the publication Kostuk et al., "Analysis and design of holographic solar concentrators", Proc. SPIE, 2008, vol. 7043, pp. 704301-704301-8, for example. When manufacturing such layer stacks of multiple individual volume gratings by way of lamination, however, maintaining a very high positioning accuracy of the individual layers is highly problematic.

Now, a major advantage of the method according to this invention is that it allows a hologram component to be made in the form of a multiple hologram in a homogeneous recording medium, namely in the form of a stack of multiple volume gratings each having a preset thickness.

As it is required to collect and convert sunlight into electric power as efficiently as possible, the hologram component with its layered structure can show at least one preset angular selectivity and/or at least one preset wavelength selectivity.

The hologram component is designed such that is transmits the light which strikes the hologram component in a preset angular range into a transparent plate which follows—preferably directly—the exit surface of the hologram component.

After passage through the transparent plate, the light strikes a two-dimensional arrangement of the energy conversion device, in one embodiment directly or through concentrators, for example, where the energy conversion device comprises at least one solar cell.

In another embodiment, the transparent plate can be designed in the form of an optical waveguide in which the light is guided towards an edge or side face of the waveguide by way of total internal reflection. The transparent plate, which here serves as an optical waveguide, can be coplanar or wedge-shaped.

At least one energy conversion device or at least one solar cell can then be disposed along an edge of the transparent plate which serves as optical waveguide. However, the light can also be guided from an edge of the transparent plate which serves as optical waveguide through a concentrator to the energy conversion device or solar cell.

However, the usable angular range of incident light and/or the spectral sensitivity range of the solar panel can also be extended further by modifying the transformation and/or conversion features of the optical elements upstream of the energy conversion device or solar cell.

It can be at least one upstream arrangement of microprisms and/or at least one diffusing surface that serves to extend the usable angular range of incident light.

The usable angular range of incident light is also extendable in that the transparent plate has preset diffusing characteristics which can vary gradually with increasing depth.

In contrast, the spectral sensitivity range of the solar panel can be extended by way of implementing quantum dots or by way of fluorescent or luminescent doping of the optical elements which are disposed upstream of the energy conversion device or solar cell, for example.

The hologram component can also be designed such that light which is reflected from the solar cell is retro-reflected towards the solar cell and/or that it realises the function of a lens, so that it can serve as concentrator.

Finally, the hologram component can also be designed such that it only guides light of a preset wavelength towards an energy conversion device or solar cell that has a preset spectral sensitivity.

Another possibility is to record the hologram component in a recording medium made of dichromate gelatine (DCG) which is modified with the help of a chemically altered sensitiser such that only when a preset exposure energy threshold is exceeded it begins to form a latent grating, which is turned into a phase-only volume grating in a hydrochemical process. The method for the generation of buried volume gratings can thus also be applied to recording media of dichromate gelatine. Thin volume gratings having a high refractive index modulation n1 can thus also be generated in a thick DCG film. In solar panels and/or solar concentrators, this has the advantage that the usable angular or wavelength range can be extended, since in this case both the angle selectivity and the wavelength selectivity ranges can be wider.

Further, the method described above can also serve to store data or safety features, where during the recording of the data or safety features in the recording medium in the form of volume gratings depth-dependent multiplexing (Z division multiplexing) is realised in addition to the angle and wavelength division multiplexing.

This means that the data or safety features can now also be encoded in different layers of the recording medium, in addition to an angle- and wavelength-specific encoding in one layer of the recording medium. As already mentioned above, this is preferably possible in a confined region of the recording medium, and preferably at a presettable distance to the surface of the recording medium, i.e. at a presettable depth of the recording medium.

As already explained above, the profile of the angular and/or wavelength selectivity is presettable, so that it is thereby in particular possible to suppress side peaks of the angular and/or wavelength selectivity during exposure.

Thanks to these features of the method, data or safety features can be encoded and decoded in a much more fail-safe manner, besides the greater storage capacity it offers.

The profile of the angular and/or wavelength selectivity is differently presettable for individual recorded data sets or safety features, so that encoding and decoding is achieved through the different angular and/or wavelength selectivity of the individual data sets. Thereby, the data storage density in the recording medium can be raised by accordingly multiplexing the individual angular and wavelength selectivity of the data sets.

Laser Doppler anemometry (LDA) serves as yet another example of the application of the method described above, where the method can be used to realise a longitudinal shift of the measurement levels in a sample. It is in particular the possibility of dynamically shifting the grating plane in the depth of the measured sample that is the key feature for this application.

A further example of the application of the method described above relates to 3D light microscopy, where the longitudinal resolution in a sample can be improved and the dynamic shift of the grating plane proves to be useful as well.

Lastly, the method can also be applied in sonography to improve the depth resolution and to confine the depth range of the sound intensity for superposed ultrasonic waves in a sample.

This means that the method according to this invention is not limited to applications that involve light waves, but that it can rather be applied preferably to other wave propagation processes which include the possibility of interference.

As regards the device aspect of the present invention, the above-mentioned object is solved by the features of claim 56. The device according to this invention thus serves for the layered generation of at least one volume grating in a recording medium by way of exposure. The device according to this invention comprises a light source and a beam splitter means. The recording medium has at least one photosensitive layer which is sensitised for a presettable wavelength of the exposure light. The beam splitter means is designed and disposed such that the exposure light which is emitted by the light source is dividable into at least two wave fronts of coherent light which are capable of generating interference. Each of the volume gratings is generatable in the recording medium by the at least two wave fronts of coherent light which are capable of generating interference. The at least two wave fronts of coherent light which are capable of generating interference are superposable in the recording medium at a presettable angle, at a presettable depth and with a presettable interference contrast. The depth and thickness of the refractive index modulation and/or transparency modulation of a volume grating in the recording medium is controllable in the direction of light propagation by depth-specific control of the spatial and/or temporal degree of coherence of the interfering wave fronts.

The device according to this invention is particularly suited to implement the method claimed in one of claims 1-30. To avoid repetition, reference is made to the description above, since it is obvious for a person skilled in the art, who understands the teachings regarding the method aspect, to design and to extend the device according to this invention. In particular, the device according to this invention can be used to make a hologram component which includes a recording medium comprising at least two volume gratings, where the hologram component is made using the method according to one of claims 1-30.

The beam splitter preferably comprises a diffraction grating, which could be designed in the form of a surface profile grating and which has been referred to as master grating above.

Now, there are a number of possibilities for embodying and continuing the teachings of the present invention. To this end, reference is made on the one hand to the dependent claims that follow claim 1, and on the other hand to the description of the preferred embodiments of this invention below including the accompanying drawings. Generally preferred physical forms and continuations of the teaching will be explained in conjunction with the description of the preferred embodiments of the invention and the accompanying drawings.

BRIEF DESCRIPTION OF THE DRAWINGS

The Figures are schematic drawings, where.

Identical or comparable parts are given like reference symbols in all the Figures.

DETAILED DESCRIPTION OF THE INVENTION

Figure 1A:
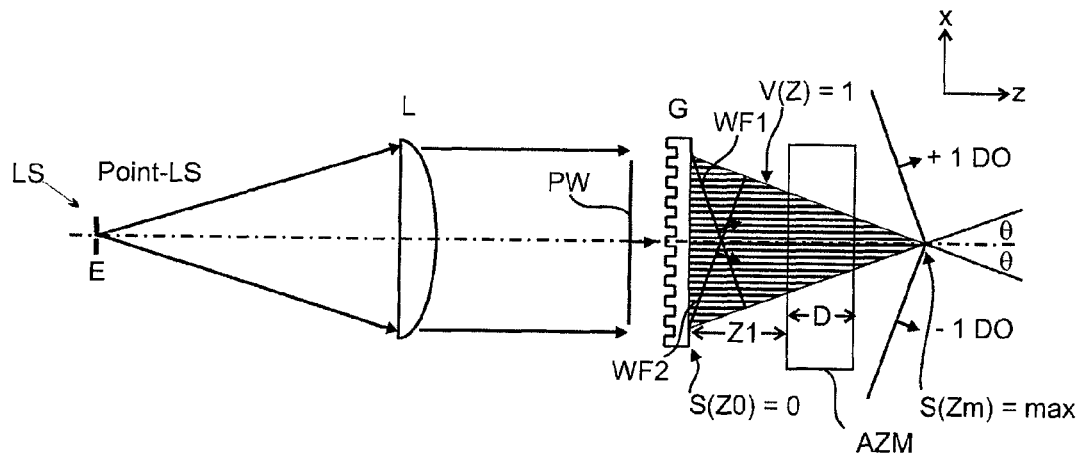
FIGS. 1a, b, and c illustrate the use of a) a point light source, b) a light source with periodic amplitude grating and c) a light source with periodic phase grating and the dependence of the interference contrast on the shift distance, which is proportional to the master grating.
Figure 1B:
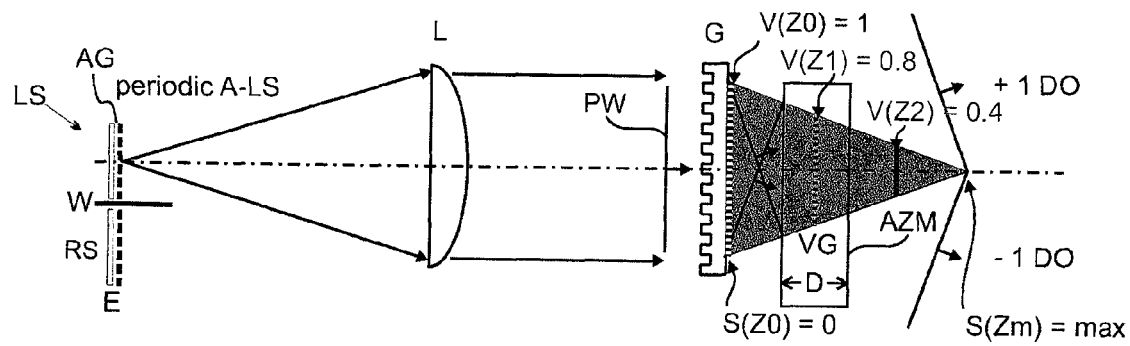
Figure 1C:
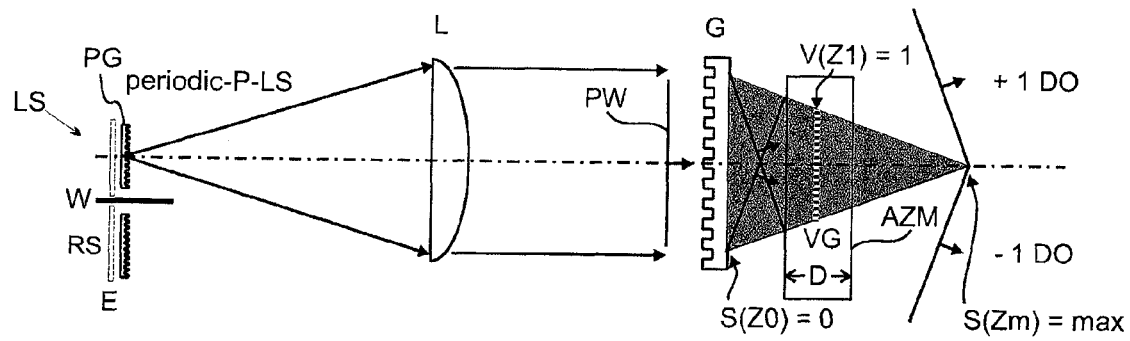

FIGS. 1b and 1c illustrate the general arrangement used to implement the method for the layered generation of at least one volume grating VG in a recording medium AZM by way of exposure, said recording medium comprising at least one photosensitive layer which is sensitised for a presettable wavelength oft the exposure light, where each volume grating is generated in the recording medium by at least two wave fronts WF1, WF2 of coherent light which are capable of generating interference, said wave fronts being superposed in the recording medium at a presettable depth z, at a presettable angle and with a presettable interference contrast, and where the depth z and the thickness of the refractive index and/or transparency modulation of a volume grating VG in the recording medium AZM is influenced by depth-specific control of the spatial and/or temporal degree of coherence F of the interfering wave fronts WF1, WF2 in the direction of light propagation.

Downstream of a master grating G, which is illuminated by a light source LS through a collimation lens L with a substantially collimated plane wave field PW, there is a relative lateral offset s(z) (shear) in the direction of light propagation between those wave fields WF1, WF2 which are propagating further downstream and which are diffracted at the master grating G, said lateral offset s(z) (shear) causing a presettable depth profile of the interference contrast V(z) of the interfering wave fields thanks to a preset complex-valued spatial and/or temporal coherence function Γ of the illuminating plane wave field PW.

Here, the interfering wave fields WF1, WF2 are different diffraction orders of the diffraction of the same collimated wave field PW that is emitted by the light source LS at the master grating G, which is disposed upstream of the recording medium AZM, seen in the direction of light propagation.

Referring to FIG. 1a, the light which is emitted by a point light source LS is collimated by a lens L, which follows in the direction of light propagation, so that a plane wave PW strikes the master grating G, which is disposed further down the optical path. According to the grating constant of the master grating G, the incident plane wave is diffracted by an angle θ so that two plane wave fields WF1, WF2 propagate downstream of the master grating, as shown in this example, where said wave fields correspond to the positive and negative first diffraction order +1 DO and −1 DO and, consequently, have an angle of 2θ to each other.

Now, the diffraction orders +1 DO and −1 DO which are diffracted at the master grating can interfere in an overlapping region which stretches from z=0 to a maximum depth and has the shape of a triangle that becomes smaller as z rises. If a monochromatic point light source Point-LS is used, this happens with a constant interference contrast V(z)=1 through the entire overlapping region. However, the master grating G can be replaced by other beam splitters, for example by a grating which is represented on a light modulator SLM.

The horizontal hatching in FIG. 1a indicates that a volume grating with a certain grating constant which depends on the angle of propagation θ of the plane wave fields WF1, WF2 which are diffracted at the master grating G can thereby be recorded at each point of the overlapping region in a recording medium AZM in a depth range D which starts at a distance z1 from the master grating G, for example. Owing to the fact that in this arrangement the interference contrast does not vary in the longitudinal direction, i.e. along the Z axis, the volume grating which is recorded at a distance z1 from the master grating G has a homogeneous form in the longitudinal direction too.

FIGS. 1 b and c illustrate the influence the shape of the light source LS, which is disposed in a plane E and which generally has a complex-valued periodic or non-periodic amplitude and/or phase distribution, has on the interference contrast V(z). It can be seen that while the interference contrast V(z) at a certain depth of the recording medium AZM depends on the lateral offset S(z) (shear) of the two interfering wave fields WF1, WF2, which is a function of the Z coordinate in the direction of propagation of the wave fields WF1, WF2, on the one hand, the presettable profile of the interference contrast V(z) which is generated in a presettable depth range of the recording medium AZM is a function of the shape of the amplitude and/or phase distribution in the plane E of the light source LS, on the other.

It is thus possible that the interference contrast V(z) that is present at the presettable depth z of the recording medium AZM, generates volume gratings in the recording medium AZM in the form of a presettable refractive index and/or transparency modulation which corresponds with an apodisation function which allows the angular and/or wavelength selectivity of the volume gratings VG to be controlled in a presettable way and any side peaks of the angular and/or wavelength selectivity of the volume gratings VG to be suppressed in a presettable way.

To achieve this, it is necessary that the plane E of a light source LS which is to be collimated and which illuminates the master grating G has a complex-valued optical transparency function which represents an amplitude and/or phase grating, an amplitude and/or phase distribution, an amplitude and/or phase grating which is superposed by an apodisation function, or an amplitude and/or phase distribution which is superposed by an apodisation function.

FIG. 1b shows the case where a monochromatic, spatially incoherent light source LS with periodic amplitude distribution (periodic A-LS)—related to the X dimension and in plane E—is used. Here, interference occurs at the shear distance of s(z)=0 with a contrast of V(z)=1 and, at a small duty factor and low transmittance of the amplitude grating AG disposed in the plane E of the light source (periodic A-LS), at a design shear distance, i.e. at the intended depth z1 behind the master grating G, with an interference contrast of V(z)=0.8, for example. At about twice the design shear distance, interference occurs with an interference contrast of V(z2)=0.4, for example.

This means that with such type of light source LS the interference contrast of the superposition of the two wave fields WF1, WF2 which are diffracted at the master grating G depends on the distance z from the master grating G and that it is controllable through the complex coherence function Γ in the plane E of the light source LS.

FIG. 1c shows the case where a monochromatic, spatially incoherent light source LS with periodic phase distribution (periodic P-LS) is used. Here, interference occurs at the design shear distance, i.e. at the intended depth behind the master grating G with a contrast of V(z1)=1, for example. To make this happen, the phase grating PG which is disposed in the plane E of the light source LS must be designed such that when it is illuminated with a plane wave PW there are chiefly the positive and negative first diffraction order +1 DO and −1 DO only which propagate downstream of the phase grating PG at high diffraction efficiency.

This way, a volume grating VG with a presettable thickness can be recorded at a presettable depth z of a sufficiently thick recording medium AZM that is adequately sensitised in that the interference contrast V(z) exceeds the sensitivity threshold of the recording medium AZM in this region only.

The period of the phase grating PG which is used in the plane E of the light source LS and the numerical aperture of the used collimation lens L together determine the design shear distance, i.e. the position of the plane in which a depth-apodised volume grating VG can be placed or recorded. Choosing the Z position of the depth-apodised volume grating VG is thus possible in a simple way by choosing the period of the light source LS or the period of the phase grating PG which is disposed in plane E accordingly or by changing these parameters.

If the amplitude and/or phase of the amplitude grating AG or phase grating PG which is used in the plane E of the light source LS is binary, for example, i.e. if the individual slits of grating are described by a rectangular function, the profile of the interference contrast V(z) around the design shear distance corresponds with the squared sinc function.

It is thus possible—if a recording medium AZM for a volume grating VG is placed in the Z region in question—for a refractive index modulation n1(z) which corresponds with the squared sinc function to be generated in the longitudinal dimension z, said refractive index modulation n1(z) being referred to as depth apodisation here. The thus recorded volume grating VG then has an angular and/or wavelength selectivity which resembles a rectangular function and which does not show any side peaks.

The choice of the amplitude and/or phase function of the slits of the grating AG or PG which is disposed in the plane E of the light source LS determines the profile of the interference contrast V(z) which is found downstream of the master grating G depending on the depth z or shear distance s(z).

If the angular and/or wavelength selectivity shall be given a profile of the function η(Θ) or η(λ) of the angle- and/or wavelength-specific diffraction efficiency, then the amplitude and/or phase function of the slits of the grating AG or PG which is disposed in the plane E of the light source LS must be given the shape of those profiles. This is a simple correlation which allows the depth apodisation to be modelled such to satisfy the requirements on the diffraction properties of the volume grating VG by choosing adequate properties of the light source LS.

The profile of the interference contrast V(z), and thus the profile of the refractive index modulation n1(z) of the recorded volume grating VG, i.e. the apodisation function n1(z) of the volume grating VG that is recorded in the recording medium AZM, are proportional to the squared absolute value of the Fourier transform of the amplitude and/or phase function of the slits of the grating AG or PG which is disposed in the plane E of the light source LS.

To calculate the profile of the interference contrast V(z), the diffraction pattern of a single slit of the grating which is disposed in the plane E of the light source LS is folded with a delta comb function of the number N of slits used. This means that the distribution of the interference contrast V(z) in the Z dimension becomes the narrower the more slits are used, even if the grating period of the grating which is disposed in the plane E of the light source LS, and thus the depth layer z in which the volume grating VG is recorded remains the same.

The shape of the angular and/or wavelength selectivity function η(Θ) or η(λ) of the volume gratings VG which are generatable at a presettable depth z is thus controllable in a volume grating that is generated at a certain depth of the recording medium AZM over the presettable profile of a refractive index modulation n1(z) in the direction of light propagation, said refractive index modulation corresponding with the interference contrast V(z), said profile representing an apodisation function, for example in the form of a squared sinc, cosine, Gaussian or approximated rectangular function.

If the recording medium AZM has a linear transfer function, then the profile of the refractive index modulation n1(z) corresponds with the profile of the interference contrast V(z) in the region in which a volume grating VG is to be recorded. If the transfer function of the recording medium AZM is non-linear, then the interference contrast V(z) must be modified accordingly in order to get a refractive index modulation n1(z) which corresponds with a squared sinc function, for example.

Generally, as with all volume gratings, the angular selectivity η(Θ) of the volume gratings VG which can be generated at a presettable depth z is further controllable by varying the thickness of the volume gratings.

In order to be able to record multiple volume gratings VG in the recording medium AZM, the recording medium AZM must have a presettable thickness D which is sufficient to accommodate at least two volume gratings, for example, which can be arranged one after another or in an interleaved manner in the direction of light propagation.

The volume gratings VG, which are generatable at a presettable depth z through depth separation and/or depth apodisation, can be designed for a presettable light wavelength λ of the useful light, which means that they preferably only influence light or useful light of this wavelength by way of diffraction.

A presettable depth apodisation and/or a presettable depth separation of the intensity modulation, i.e. of the interference contrast V(z), of the exposure light in the recording medium AZM can also be set dynamically, for example by way of a dynamically controllable amplitude and/or phase grating AG or PG in the plane E of the light source LS, for example in the form of a programmable light modulator (SLM) which realises the grating.

The periodic light source LS can be a phase-SLM, for example—i.e. a spatial light modulator (SLM) which can modify the optical path length or the local phase of the light which interacts with the spatial light modulator dependent on the spatial positions—or a complex-valued SLM—i.e. a spatial light modulator which can modify the optical path length or the local amplitude and phase of the light which interacts with the spatial light modulator dependent on the spatial positions. This makes it possible to vary the narrow region which shows a high interference contrast V(z), which is indicated in FIG. 1c, in the Z dimension and, in particular, to cover it at a presettable speed.

Figure 2:
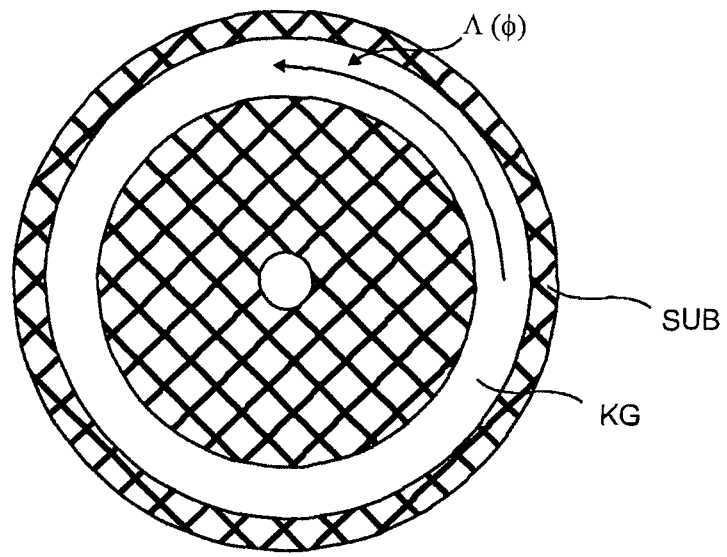
FIG. 2 shows an annular grating on a substrate which can rotate quickly, where the grating period varies depending on the angle.

It is also possible, for example, to dispose in the plane E of the light source LS a phase grating PG whose period changes continuously and cyclically. This phase grating can be illuminated partly and be moved at a fast pace. For example, the phase grating can be an annulus KG which is arranged on a circular substrate SUB, as is shown in FIG. 2. The phase grating can be operated in either reflective or transmissive mode.

This possibility of dynamically controlling the interference contrast V(z) is indicated in FIGS. 1b and 1c. Referring to FIG. 2, the amplitude and/or phase gratings AG or PG are here designed in the form of an annulus KG and arranged on a circular substrate SUB which is mounted to a rotating shaft W that is driven by a motor (not shown).

The grating period can increase in an angular range from 0° to 180° and decrease again in a range from 180° to 360°, for example. If the substrate SUB that is mounted on the shaft W rotates, then a fast depth scan becomes possible, because the depth z of the region with a high interference contrast V(z) as identified in FIG. 1c varies in synchronism with the rotation angle (I) of the grating substrate. Now, if stepping motors or synchronous motors are used, then a precise and temporally fix assignment of the depth levels z with the detector signals of a subsequently arranged measuring arrangement becomes possible.

The profile depth or etching depth of the amplitude or phase grating KG which is situated on the circular substrate SUB can be optimised such to provide maximum diffraction efficiency of the first diffraction orders +1 DO and −1 DO, for example. The circular disc with the radial grating can be disposed in the plane E of the light source LS, where said plane can additionally accommodate a diffusing plate (not shown). Diffusing plate and grating are then moved relative to each other.

Signal detection and variation of the grating period can preferably be synchronised such that a fix grating with the period Λ can be assumed for the time window of the measurement or measuring value integration. The diffusing plate used (not shown) can rotate an order of magnitude faster that the circular disc which carries the grating, for example.

One advantage of the method according to this invention is that it allows in particular also large-area volume grating structures with multiple depth-separated or interleaved volume gratings VG to be realised.

Here, the master grating G is provided in the form of a large-area surface profile grating, for example, whose illuminated surface is either a part of the surface of the recording medium AZM of the volume grating VG or which is identical with the latter. This means that the volume grating structure can also be composed of partial areas or tiles, if necessary.

Asymmetrical profiles of the refractive index modulation n1(z) in the recording medium AZM can be generated in that an asymmetry of the phase and/or amplitude distribution is introduced in the plane E of the light source LS, because this is directly reflected in the shape of the interference contrast V(z).

A saw-tooth-shaped surface profile phase grating can be used, for example, in the plane E of the light source LS in order to generate an correspondingly asymmetrical profile of the interference contrast V(z) at a certain depth z of the recording medium AZM.

As an alternative to using the interferences of the $0^{th}$ and $1^{st}$ diffraction order of the diffraction of the exposure light at the master grating G, it is also possible to use interferences of the $0^{th}$ and $2^{nd}$ diffraction order or other diffraction orders to generate the volume grating VG in the recording medium AZM. This allows the grating constant of the volume grating VG to be influenced, because higher diffraction orders propagate at larger angles θ. To be able to do so, however, it is necessary to design the master grating G such that only those diffraction orders which are needed for recording are emphasised while the other diffraction orders are suppressed.

The recording medium AZM can also have an initiator, where a constant light portion of the exposure light can be used to activate the initiator of the recording medium. Examples of such a medium include BayFol HX or photo-thermo-refractive (PTR) glass, where by way of preliminary exposure of either surface to UV radiation a presettable refractive index profile n1(z) can be generated in the direction of light propagation prior to the recording of the volume grating.

Alternatively, an electrically controllable material, such as a polymer dispersed liquid crystal (PDLC) layer, for example, i.e. a combination of an LC layer and a curable polymer, can be used as a recording medium to generate switchable volume gratings. The diffraction efficiency of the generatable volume gratings can thus be controlled, namely by way of electrically induced re-orientation of the liquid crystals.

Various reconstruction geometries (plane wave/plane wave, plane wave/spherical wave and others) can be realised in a preset fix or switchable form by way of correspondingly designing the generatable volume gratings.

It is possible, for example, to generate a volume grating VG which transfers a plane wave into a convergent spherical wave, and which thus shows the effect of a field lens. Such a field lens can be used in an autostereoscopic or holographic display, for example. If one or more further volume gratings VG can be recorded or generated in the recording medium AZM with the method according to this invention in order to achieve further optical functions, then the exposed recording medium AZM can realise multiple optical functions and be integrated as a single component into such a display.

During the recording of the volume gratings VG in the recording medium AZM, reflections can be suppressed through a presettable choice of the spatial and/or temporal coherence properties of the exposure light. The spectral bandwidth of the light source LS and the complex grating in the light source plane E must be designed accordingly for this. This does not actually prevent reflections during the recording, but thanks to this measure the reflected portions can no longer interfere constructively with non-reflected portions, so that the sensitivity threshold for the exposure of the recording medium is thereby not exceeded.

As an alternative to the afore-mentioned interference method, the recording of a volume grating VG with preset shape and thickness at a preset depth z of the recording medium AZM can also be achieved through chemical or optical depletion of the initiator in the recording medium AZM from the surfaces inwards. However, the number of generatable depth-separated volume gratings VG is then reduced, in fact, it is practically limited to one single grating.

Moreover, the scope for design regarding the shape of the volume grating is little flexible only.

Many transformations of a complex wave field into another complex wave field, such as, for example, the realisation of a combined field lens with on-axis effect, comprising a first transmissive volume grating, which transforms an on-axis plane wave into an off-axis plane wave, and a second transmissive volume grating, which transforms an off-axis plane wave into an on-axis spherical wave, can be implemented well in the sandwich design of flat holographic 3D displays in the form of transmissive volume gratings, which is easier than fitting reflective volume gratings into the arrangement. The realisation of transmissive volume gratings with the possibility to reduce the thickness of the volume grating to a fraction of the thickness of the recording medium, to choose a particular Z plane in the recording medium and to choose a certain profile of the depth apodisation of the refractive index distribution $n1(z)$ is thus preferred to reflective volume gratings.

Moreover, transmissive volume gratings can be regenerated easily using a master grating. These can be surface profile gratings, for example, such as DOEs, blazed gratings, binary phase gratings, multi-stage phase gratings, sub-1 phase gratings, such as those with variable duty factor and fix web widths or fix groove widths, for example. For example, controllable gratings, such as polarisation-dependent liquid crystal gratings (PDLCG), which are multi-layer arrangements which can 'select' a set of angles, or LCG, which can generate continuously varying diffraction angles, where the diffraction efficiency BWG is about 0.5, for example, and where there are preferably only two diffraction orders, are suited for flexible geometries.

Figure 3:
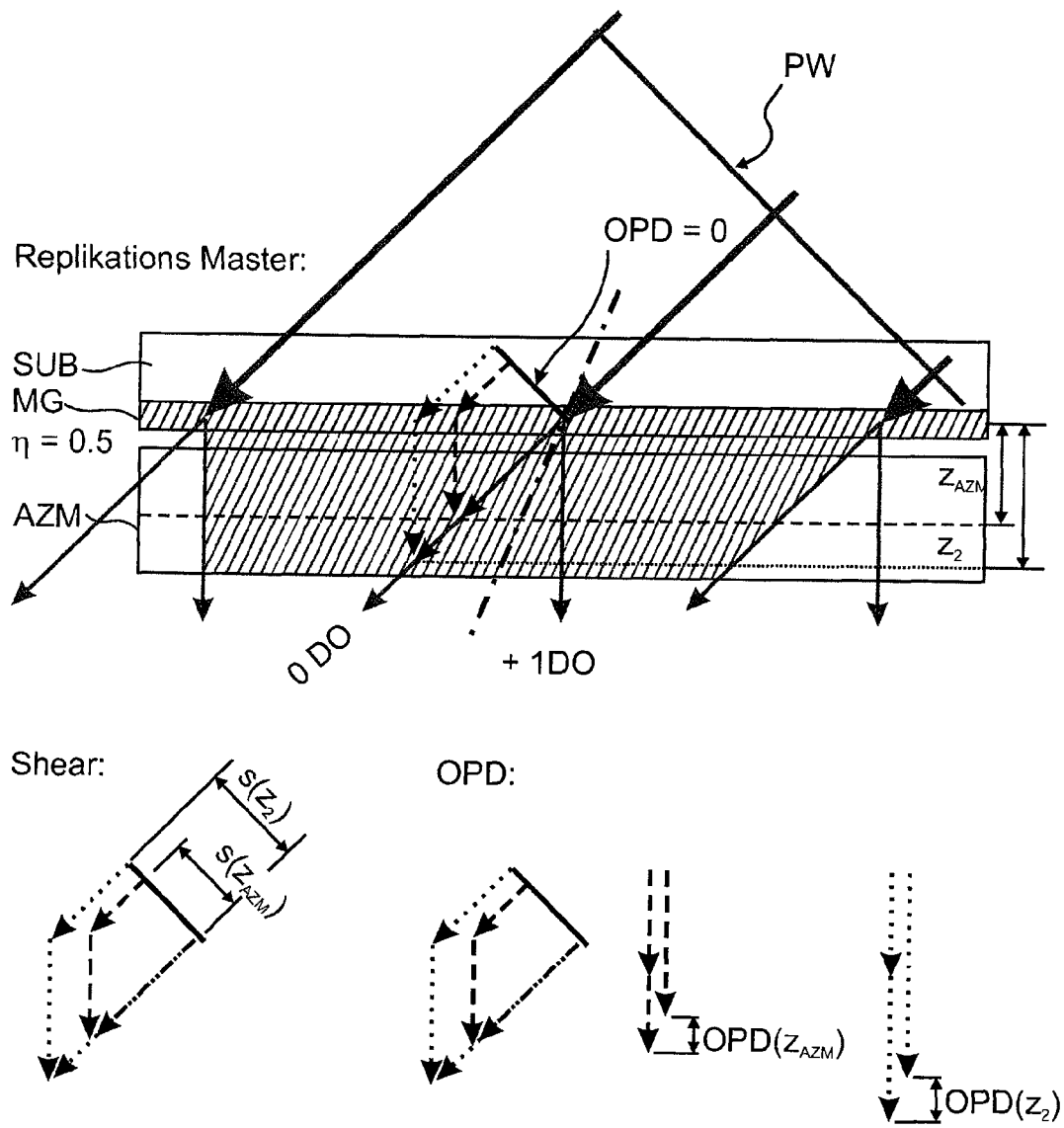
FIG. 3 shows an arrangement for the replication of a two-beam interference pattern in the form of a master volume grating in a contiguously disposed recording medium.

Volume gratings can serve as master gratings for replication, for example. If two-beam interference patterns are to be transmitted, the volume gratings can easily be designed to have a diffraction efficiency which makes for a sufficient interference contrast $V(z)$ in the recording medium. The diffraction efficiency of the master volume grating can be designed to lie between $\eta=0.4$ to $\eta=0.6$, for example. FIG. 3 shows an arrangement which can be used to copy a two-beam interference pattern. The master volume grating MG to be replicated is arranged on the exit-side surface of a substrate SUB.

As shown in FIG. 3, there are two parameters of the wave fronts of the $0^{th}$ and $1^{st}$ diffraction order 0 DO and +1 DO of the incident plane wave PW that vary depending on the distance z from the master volume grating MG of the replication, i.e. depending on the depth z in the recording medium AZM, namely the absolute value of the lateral offset $s(z)$ (shear) and the absolute value of the longitudinal offset $OPD(z)$, both of which being usable to realise the desired depth apodisation of the refractive index distribution $n1(z)$ in the recording medium AZM. The contribution of the spatial coherence to the interference contrast $V(z)$ is influenced by the lateral offset $s(z)$ (shear), while the contribution of the temporal coherence of the exposure light to the interference contrast is influenced by longitudinal offset $OPD(z)$. The lateral offset $s(z)$ (shear) and the longitudinal offset $OPD(z)$ of the wave fronts are shown for two different Z values in FIG. 3.

To get an interference contrast, which depends on the absolute value of the longitudinal shift $OPD(z)$, that is suitable to satisfy the requirements of a particular exposure set-up, a spectral filter which is particularly tailored to the exposure light must be used. Spectral filters can be metal interference filters (filter, MW), transmissive or reflective dielectric layer stacks, fix or variable Fabry-Perot interference filters, reflective or transmissive volume gratings and modified spectrometers, to name just a few examples.

The following embodiment of the method according to this invention relates to a beam combiner which includes a recording medium AZM with at least two volume gratings with presettable thickness and which serves to superpose the light which is emitted by pixels of a light modulator SLM.

Such a beam combiner is a major component in the realisation of a holographic direct-view display with large image diagonal, for example. The functional principle and fields of application of such a beam combiner are disclosed in document WO 2010/149588 A1, for example, so that the embodiments detailed there can be realised to apply such a beam combiner in a holographic direct-view display. Insofar, reference is made in this respect to document WO 2010/149588 A1.

The volume gratings VG which are generated in the way described above exhibit an angular selectivity whose width and, optionally, profile are presettable. This is necessary in particular to suppress higher diffraction orders and to let only light of a certain diffraction order pass to the eyes of the observer, when the beam combiner is used in a direct-view display.

Figure 4:
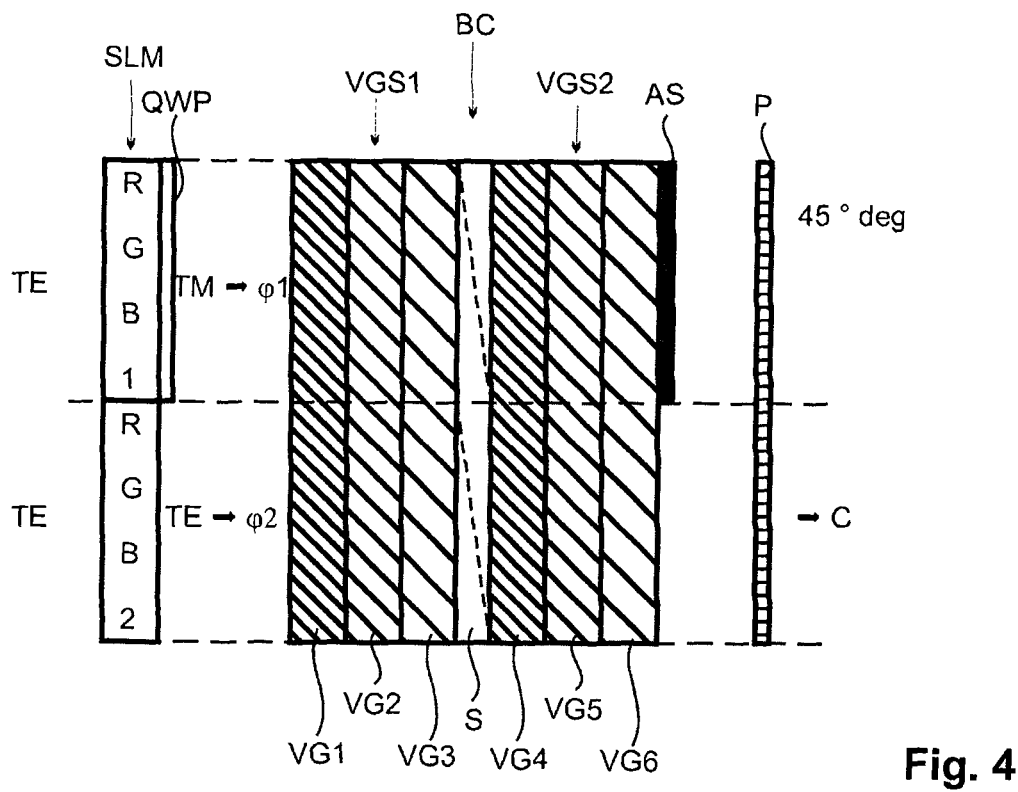
FIG. 4 shows a beam combiner which comprises a layer stack of six volume gratings and a spacer layer.

FIG. 4 shows an exemplary embodiment of such a beam combiner BC for two adjacent RGB pixels RBG1 and RGB2 of a light modulator SLM, which can be used in a holographic display, for example.

It comprises a layer stack VGS1, VGS2 of two groups at three volume gratings VG1, VG2, VG3 and VG4, VG5, VG6, each with a presettable thickness, and an intermediate layer S with a different presettable thickness.

To avoid loss of light, the overall thickness of the volume grating stack should not exceed a preset value if an aperture stop (not shown) is disposed downstream of the beam combiner BC, seen in the direction of light propagation, for example.

For use in a holographic display, it is further necessary that an angle tolerance of a reconstruction geometry of <0.1° is maintained for all the three primary colours (RGB) and all the six volume gratings VG1 to VG6.

FIG. 4 shows the beam combiner BC which combines the modulated light which is emitted by two adjacent RGB modulator cells RGB1, RGB2 of a light modulator SLM. Such an arrangement is required for holographic reconstruction by way of complex-valued two-phase encoding of the SLM, for example.

The light which is emitted by the two RGB modulator cells RGB1, RGB2 has the same polarisation, marked TE in the drawing, but a different phase, marked $\phi1$ and $\phi2$ in the drawing. It strikes a first stack VGS1, which comprises three wavelength-selective volume gratings VG1, VG2, VG3, each of which affecting one of the three primary colours RGB only. Further, the gratings are polarisation-selective and only influence the light with TM polarisation, for example. Now, referring to FIG. 4, in order to deflect the upper beam RGB 1 towards the lower beam RGB2, the former is converted into a TM-polarised light beam by a $\lambda/2$ plate QWP that follows in the direction of light propagation. The volume gratings VG1, VG2, VG3 of the first grating stack VGS1 diffract this light beam by a certain angle towards the lower light beam RGB2 while they let pass the second, TE-polarised light beam RGB2 without being diffracted.

The first grating stack VGS1 is followed in the direction of light propagation by a spacer layer S, whose thickness is chosen depending on the deflection angle of the first grating stack VGS1 such that the upper light beam RGB1 is combined with the lower light beam RGB2 in the lower half of the beam combiner. The grating stack VGS2 that follows in the direction of light propagation, which also comprises three wavelength-selective volume gratings VG4, VG5, VG6, each of which again only influencing light of one of the three primary colours and only light with a TM polarisation, deflects the light beam which is emitted by the upper modulator cell RGB 1 such that it is parallel to the optical axis, while the light beam that is emitted by the lower modulator cell RGB2 is not influenced.

The two light beams are thus combined or superposed and continue propagating in the same direction. They only differ in their phase φ and in their TE or TM polarisation. They thus represent a complex modulation value C of the light modulator SLM as the two phase values φ1 and φ2 are superposed. Since the two light beams have perpendicular directions of polarisation, the polarisation plane of the combined light beam is turned by 45° compared to the original polarisation planes. A polariser P which is disposed further downstream in the direction of light propagation only lets pass light with this direction of polarisation, while an aperture stop AS which is disposed in the section of the upper light beam RGB 1 blocks the non-deflected stray light of the light beam RGB1 coming from the upper modulator cell.

In this embodiment, the volume gratings of the two grating stacks VGS1 and VGS2 must be very thin in order to achieve a great angular selectivity of the diffraction efficiency η(Θ). The width to be achieved lies between 1° and 2°.

It is presently not possible using prior art methods to record such a beam combiner with six volume gratings in a single recording medium AZM in one go. Instead, six volume grating layers must be recorded separately using a prior art technology, for example, and be combined later to form one optical component, for example in that the six volume grating layers are laminated. This must be done such that the mechanical stress which may thereby occur does not alter the grating geometry of the individual volume gratings, which is very difficult to achieve.

Another preferred application of a hologram component HB which is generated with the method according to this invention relates to the improvement of solar panels SM, in particular to an extension of the useable angular and/or wavelength spectrum.

Figure 5A:
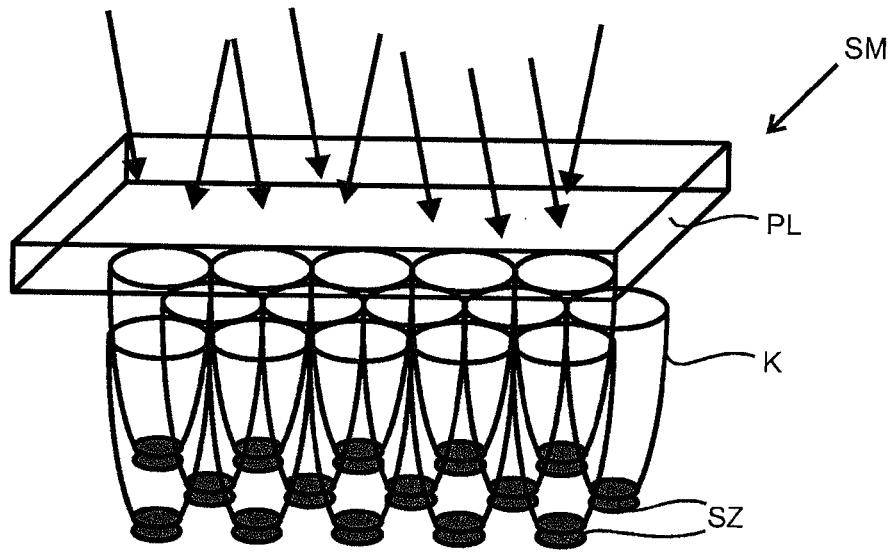
FIG. 5a illustrates a two-dimensional arrangement of solar cells, each of which being combined with a parabolic concentrator and being fitted with a cover glass in form of a transparent plate.
Figure 5B:
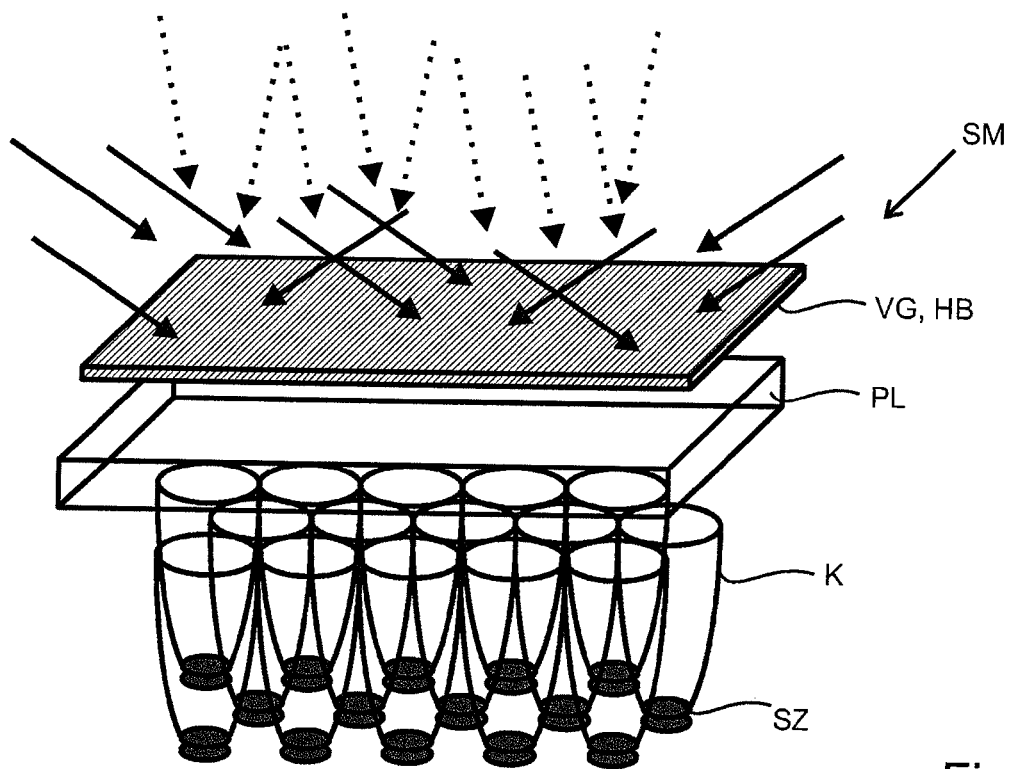
FIG. 5b illustrates the same arrangement as shown in FIG. 5a with a hologram component which is disposed atop and which serves to extend the angular range of the light beams which can get through to the solar cell, FIGS. 6a, b and c show the transparent plate with focus on its function as an optical waveguide which guides the incident light that comes from the hologram component to one of its edges, thereby illuminating a) a solar cell directly or b) and c) through parabolic concentrators, and FIGS. 7a and b show a solar panel with a) a transparent plate and b) a parabolic concentrator, each of which being doped with quantum dots or luminescent or fluorescent substances (indicated by dots in the drawing) in order to improve the quantum efficiency.
Figure 7A:
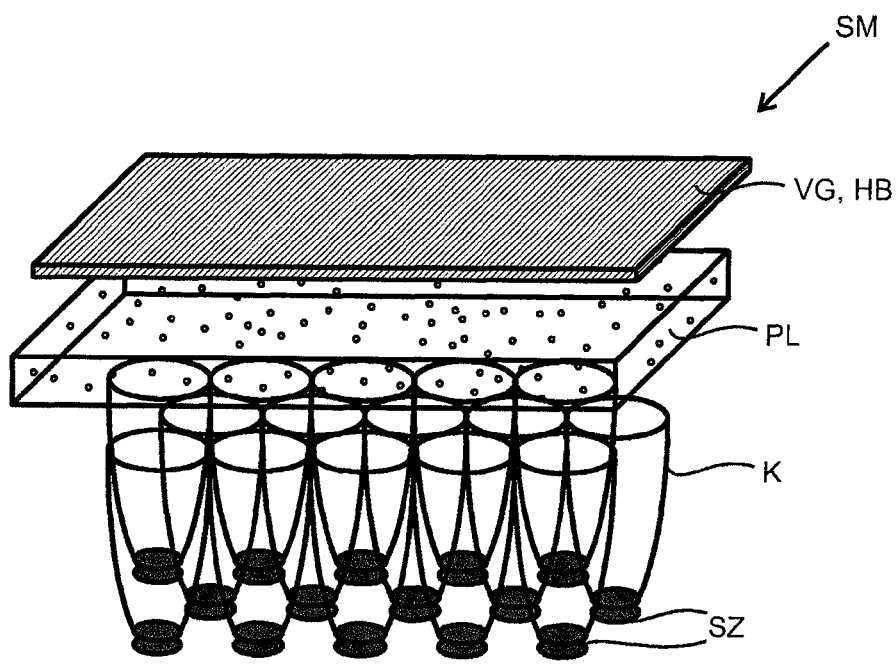

FIG. 5a illustrates a two-dimensional arrangement of solar cells SZ of a solar panel SM, each of which being combined with a parabolic concentrator K and fitted with a cover glass in the form of a transparent plate PL. FIG. 5b illustrates the same arrangement as shown in FIG. 5a with a hologram component HB which is disposed atop and which serves to extend the angular range of the light beams which can get through to the solar cell SZ. The hologram component HB is only shown separate from the transparent plate PL in this exploded view to show it clearly in the drawing (same applies to FIG. 7a). In a finished solar panel SM, the hologram component HB is typically attached to the transparent plate, for example laminated to it. Such hologram components HB can typically have a layered structure which comprises individual volume gratings VG with preset angle-specific diffraction efficiency which are joined by way of lamination, for example. An angle combination of 50° and 60°, for example, can be used as one of multiple acceptance angle geometries. In order to be able to realise a wide angular and/or spectral range, the thickness of the individual volume gratings VG of the stack should lie in a range of 3-10 micrometers, for example.

In order to reduce the costs of lamination, individual volume gratings VG of the grating stack or hologram component HB can be recorded using the method according to this invention in a recording medium AZM which comprises a single layer only, namely the hologram component. For example, this technology allows multiple diffractive field lenses with preset thickness to be arranged one atop the other in a single layer of the recording medium AZM, e.g. in the form of a photopolymer, and/or the side-bands of the angular spectrum η(Θ) to be suppressed through apodisation of the refractive index distribution n1(z) in the layer of the particular volume grating VG.

Figure 6A:
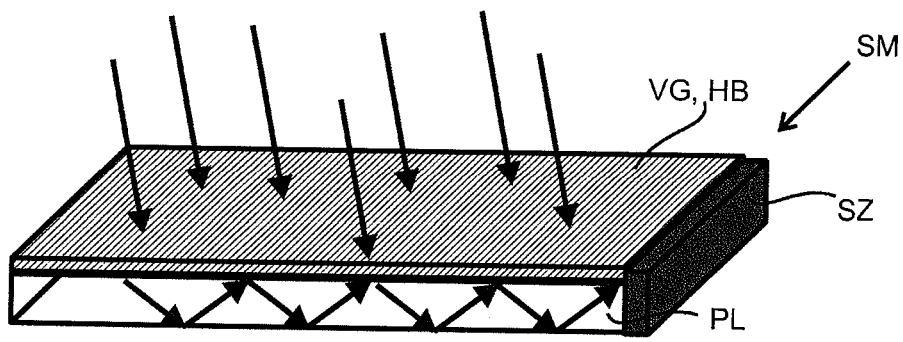
Figure 6B:
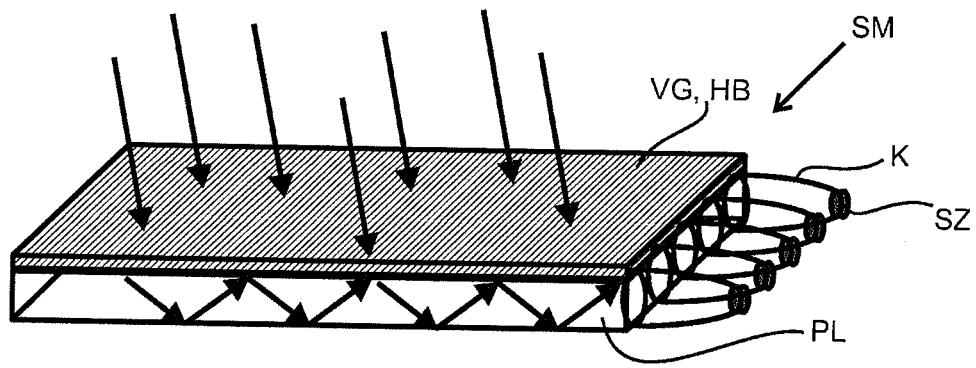
Figure 6C:
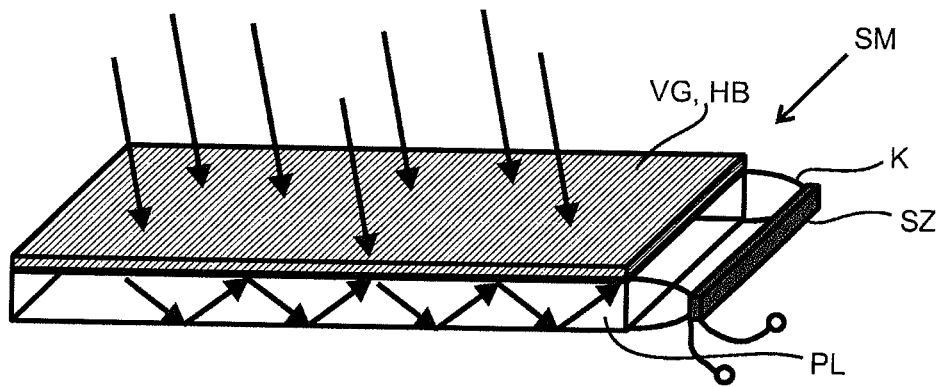

The arrangement shown in FIGS. 5a and 5b can also be operated in other modes than the transmissive mode. As is shown in FIGS. 6a to 6c, the cover glass in the form of a transparent plate PL can also serve as a light waveguide which guides the incident light which comes from the hologram component HB and which strikes the light waveguide at a preset angle by way of total internal reflection towards an edge of the light waveguide, where an energy conversion device or solar cell SZ is illuminated either directly (FIG. 6a) or through parabolic reflective concentrators K (FIGS. 6b and 6c). The hologram component HB also effects an improvement of the efficiency of the energy conversion device or solar panel SM through an improved acceptance of the angular and/or wavelength spectrum η(Θ) or η(λ) of the incident solar radiation that can be used by the solar cell. Insofar, it is preferably not necessary to track the orientation of the entire solar panel SM to the actual position of the sun, but it is rather sufficient to mount the solar panel SM in a static position.

Instead of transmissive volume gratings VG, it is also possible to use reflective volume gratings, which are then disposed on the bottom face of the transparent plate PL (not shown in the FIGS.). The gratings used can also be transmissive or reflective surface profile gratings, for example. Generally, any kind of technological solutions which are employed for light control or light guidance in illumination devices for display devices can also be used in the context of solar panels SM. This regards arrangements of microprisms for enlarging the light acceptance angle, for example, or diffusing surfaces, also in combination with microprisms. Light scattering effects in volume materials can also be taken advantage of. In this case, a gradient of the diffusing effect can be generated depending on the penetration depth of the radiation, for example, so that the diffusing effect of the material increases in the Z dimension. This way, the angular range of the incident light can be modified such that it satisfies the condition for propagation by way of total internal reflection in the transparent coplanar plate PL and is guided towards one of the edges.

Figure 7B:
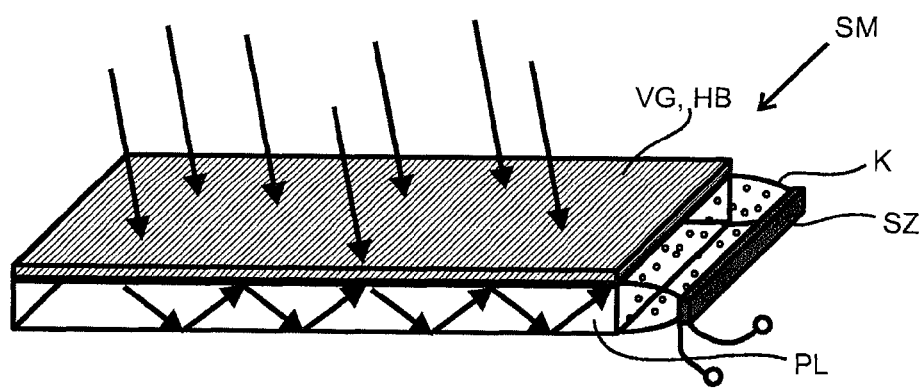

Another possibility is to combine the diffusing effects with frequency conversion effects, either with view to improved fulfillment of the condition for total internal reflection in the transparent plate PL or to the adaptation to the spectral sensitivity of the solar cell SZ which is used for energy conversion. For example, it is possible to dope the material of the transparent plate PL and/or of the concentrators K with quantum dots. The quantum efficiency of the materials used for this can also be improved by way of fluorescence or luminescence doping. This is indicated by dots in FIGS. 7a and 7b for a transparent plate PL which is operated in transmissive mode, and for concentrators K which are disposed along an edge of the transparent plate PL, respectively.

If disposed in front of the concentrator K, for example, a hologram component HB with wavelength-specific reflective properties can also be used to guide the light which is reflected by the energy conversion device or solar cell SZ back to the energy conversion device or solar cell SZ. It is further possible to provide the volume gratings VG of the hologram component HB with a lens function, so that the concentrator K can be realised in the form of a diffractive lens that is run in off-axis mode, for example. Finally, it is possible to design the direction- and/or wavelength-modifying properties of the hologram component HB according to this invention such that energy conversion devices or solar cells SZ with different spectral characteristics which are used in a solar panel SM are excited only by those portions of the incident light which match the spectral properties of these cells.

Further applications of the method according to this invention include storage of data or safety features, where during the recording of the data or safety features in the recording medium in the form of volume gratings depth-dependent multiplexing (Z division multiplexing) is realised in addition to the angle and wavelength division multiplexing.

Since the profile of the angular and/or wavelength selectivity $\eta(\Theta)$ or $\eta(\lambda)$ of the volume gratings is presettable, side peaks of the angular and/or wavelength selectivity can be suppressed effectively.

Since the profile of the angular and/or wavelength selectivity $\eta(\Theta)$ or $\eta(\lambda)$ is differently presettable for individual recorded data sets or safety features, encoding and decoding can be achieved through the different angular and/or wavelength selectivity of the individual data sets. The susceptibility to defects is thus substantially reduced in these applications.

The method according to this invention is also applicable in laser Doppler anemometry (LDA), 3D light microscopy and sonography.

In LDA, the frequency of the diffused light which comes from moving particles is determined. Since the grating period of the interference pattern is known, it is possible to determine the speed of the moving particles. Generally, this is possible with an arrangement as shown in FIG. 1a, where the measuring range covers the entire depth (Z dimension) of the overlapping region downstream of the master grating G in which the wave fields WF1 and WF2 interfere.

However, it is advantageous to use an arrangement as shown in FIG. 1c to realise and longitudinally shift measuring planes in a sample whose extent in the Z dimension is substantially lower than in the arrangement shown in FIG. 1a. The localisation of the diffused light and, consequently, the speed measurement can be limited to a volume whose extent in the Z dimension is only $\frac{1}{100}$ to $\frac{1}{1000}$ of that of the volume which is illuminated coherently and at great contrast in the conventional way. The longitudinal spatial resolution of the measurement in the Z dimension can thus be improved significantly.

In 3D light microscopy, the stripe pattern projection method is used to measure surface profiles of micro-structures. In mere surface profiles—with the exception of very deep structures—it is unproblematic if the interference contrast has a large extent in the Z dimension.

However, stripe pattern projection is also used in fluorescence microscopy in order to improve the spatial resolution. In this case, the term 'structured light' is used. To be able to improve the spatial resolution it is necessary to take at least three shots with displaced grating. The image which is visible on the detector camera then contains stripes of the structured illumination. Phase-shifting algorithms can then be used for analysis. If the five-phase algorithm is used, for example, five shots must be taken with the amplitude grating, which serves as illumination pattern in the object plane, being shifted by $\lambda/4$ between the individual images. To improve the spatial resolution both in the X and Y dimension, i.e. to detect spatial frequencies in the XY plane of the object, a stripe pattern must be provided in multiple directions—generated one after another, for example.

In the application of the method according to this invention in 3D light microscopy to improve the longitudinal or axial resolution in a sample, it is advantageous to generate a preferably sinusoidal stripe pattern in an arrangement as shown in FIG. 1c, said stripe pattern having a greatly limited extent in the Z dimension thanks to the preparation of the spatial coherence of the wave fields WF1 and WF2 which interfere downstream of the master grating G, where the stripe pattern is displaceable both in the Z dimension and perpendicular to it. In contrast to the conventional structured illumination—as is used in fluorescence microscopy, for example—this method makes for a further reduction of the point spread function (PSF). The objective lens in the illumination path of the microscope is then situated downstream of the grating G in FIG. 1c, for example.

Being applied for structured illumination, the method for generating depth-separated and/or depth-apodised volume gratings VG according to FIGS. 1b and 1c can generally be considered to be a method for generating structured wave fields. Being applied for 'structured sounding', it can also be used in sonography or ultrasonic microscopy to improve the depth resolution and limitation of the depth range of the sound intensity when superposing ultrasonic waves in a sample.

In ultrasonic microscopy, the preparation of the spatial coherence of the ultrasonic wave fields can be used to reduce the dimensions of a resultant point spread function PSF. Using the method according to this invention, it is possible to extend the phase-shifting stripe projection for ultrasonic testing such that the ultrasonic interference pattern which occurs in the depth is greatly limited in the Z dimension by choosing an appropriate complex-valued transparency function in the plane of the sound source, where the ultrasonic interference pattern can be displaced dynamically in the Z dimension for depth discrimination and perpendicular to it for phase shifting.

Moving diffusing plates can also be used in ultrasonic microscopes for dynamic depth scanning. They can also be embedded in oil, for example, and perform a lateral movement in the order of magnitude of some micrometers.

It further lends itself to use a 'phased array'. This can be a one-dimensional piezo transducer (PZT) line or a two-dimensional PZT array, for example. These arrays can generate the static and the fix phase portion in the plane of the sound source.

The invention shall not be limited to the embodiments and applications described above; it can be used in the widest sense for forming and positioning volume grating structures in recording media.

Generally, the method of modelling the temporal and spatial coherence function $\Gamma$ following the method according to the present invention can be used for depth localisation (depth discrimination) and/or depth apodisation of interference patterns, specifically for the generation of volume gratings which are required for special applications. On the one hand, these are phase-shifted volume gratings.

In autostereoscopic and holographic 3D displays, it can be preferable, for example, that light which propagates in certain spatial directions is let pass and limited sharply as regards its angular and/or wavelength range. It is thus possible to use multiple volume gratings, for example, to specifically cut out angular ranges (or wavelength ranges), i.e. to deflect them into uncritical directions, for example directions which do not affect the observer.

Another type of filter is represented, for example, by a field lens which is composed of two volume gratings, where a first, very thin volume grating VG1 diffracts the light which strikes the grating surface at right angles—including an angular range of ±2°, for example—by 45° at a diffraction efficiency of η>0.8, and where a second, significantly thicker volume grating VG2 diffracts towards and focuses on the optical axis the light which strikes it at an angle of 45°—including a small angular range of +0.5°, for example.

An inventive solution for a directional filter is realised for example in that, in the case where filtering is desired during straight passage, two thin, generally also n1(z)-apodised volume gratings VG1 and VG2 are generated at depths z1 and z2, where said volume gratings diffract the light which is incident at right angles—including an angular range of +2°, for example, by 45°, for example, at a diffraction efficiency of η>0.8, and where these volume gratings are phase-shifted by π relative to each other.

This special arrangement of two volume gratings, which can also be considered to be a composite volume grating with a phase shift of π, allows a very narrow angular range (or wavelength range) to be propagated along the optical axis, for example, or along any other design direction, where immediately adjacent angular ranges or wavelength ranges are diffracted into uncritical spatial directions.

The phase shift between the individual exposures can be realised, for example,—depending on the geometry—by changing the relative lateral or axial position of master grating G and recording medium AZM, or by introducing a very small illumination angle. The very small additional angle which is to be introduced depends on the grating period and on the distance between the master grating G and recording medium AZM.

This principle of generating volume gratings which are separated in the Z dimension and which are phase-shifted—including more than two gratings—can be applied to realise a multitude of special diffraction functions.

On the other hand, the method according to this invention also allows volume gratings for different wavelengths to be generated which are displaced in the depth z.

To be able to form temporally sharply limited light pulses, for example, it is necessary to compensate any transit time differences among different wavelengths.

Thanks to the method according to this invention, volume gratings which diffract different wavelength ranges can be recorded at different depths z, so that transit time differences can be introduced specifically for individual wavelength ranges such to compensate any transit time differences that occur downstream of this correcting volume grating stack and allowing light pulses to be formed in accordance with a design specification.

Finally, the embodiments and applications described above shall solely be construed to illustrate the claimed teaching, but that the claimed teaching is not limited to these embodiments and applications.

The invention claimed is:

1. A method for the layered generation of at least one volume grating in a recording medium by way of exposure with exposure light being emitted by a light source, said recording medium comprising at least one photosensitive layer which is sensitised for a presettable wavelength of the exposure light, the method comprising the steps of:

generating each volume grating in the recording medium by at least two wave fronts of coherent light which are capable of generating interference, superposing said wave fronts in the recording medium at a presettable depth, at a presettable angle and with a presettable interference contrast, generating the at least two wave fronts of coherent light by diffracting a collimated wave field by a master grating, the master grating being disposed in front of the recording medium and being illuminated with the collimated wave field which is generated by the light source; and controlling the depth and the thickness of at least one of a refractive index modulation and a transparency modulation of a volume grating in the recording medium by depth-specific control of at least one of a spatial and a temporal degree of coherence of the interfering wave fronts in the direction of light propagation, wherein at least one of an amplitude grating and a phase grating is arranged in a plane of the light source which illuminates the master grating, the at least one of the amplitude grating and the phase grating generates the presettable depth-dependent profile of the interference contrast in a presettable depth range of the recording medium.

2. The method according to claim 1, wherein downstream of the master grating there is a relative lateral offset in the direction of light propagation between the wave fields resulting from diffraction of the collimated wave field at the master grating and propagating further downstream, said relative lateral offset causing the presettable depth-dependent profile of the interference contrast of the interfering wave fields due to a preset complex-valued spatial and/or temporal coherence function of the illuminating wave field.

3. The method according to claim 2, wherein the interfering wave fields result from different diffraction orders of diffraction at the master grating of the same collimated wave field.

4. The method according to claim 1, wherein the interference contrast that is present at the presettable depth of the recording medium generates volume gratings in the recording medium in the form of at least one of a presettable refractive index modulation and a transparency modulation which corresponds with an apodisation function which allows the angular selectivity or wavelength selectivity of the volume gratings to be controlled in a presettable way and any side peaks of the angular selectivity or wavelength selectivity of the volume gratings to be suppressed in a presettable way.

5. The method according to claim 2, wherein the plane of the light source, which illuminates the master grating, has a complex-valued optical transparency function which comprises at least one of an amplitude grating and a phase grating, at least one of an amplitude distribution and a phase distribution, at least one of an amplitude grating and a phase grating which is superposed by an apodisation function, or at least one of an amplitude distribution and a phase distribution which is superposed by an apodisation function.

6. The method according to claim 1, wherein the shape of the angular selectivity or wavelength selectivity of the volume gratings which can be generated at a presettable depth is adjustable through the presettable profile of a refractive index modulation in the direction of light propagation, said profile being an apodisation function with the shape of a squared sinc, squared cosine, squared Gaussian or a squared approximated rectangular function.

7. The method according to claim 1, wherein the angular selectivity of the volume gratings which are generatible at the presettable depth is controllable through the thickness of the volume gratings or where the recording medium has a presettable thickness which allows at least two volume gratings to be recorded in the recording medium, where the volume gratings are arranged one after another or in an interleaved manner in the direction of light propagation.

8. The method according to claim 1, wherein multiple volume gratings which are generatible at presettable depths are each designed for a specific presettable light wavelength and only influence light of this wavelength by way of diffraction.

9. The method according to claim 1, wherein a depth apodisation or a depth separation of the intensity modulation of the exposure light in the recording medium is controlled dynamically.

10. The method according to claim 1, wherein the profile of the refractive index modulation of the volume grating in the recording medium is determined by a presettable adjustment of the complex amplitude in the plane of the light source which illuminates the master grating.

11. The method according to claim 1, wherein the master grating is provided in the form of a surface profile grating whose illuminated surface is either a part of the surface of the recording medium of the volume grating or which corresponds to this surface.

12. The method according to claim 1, wherein the at least one of the phase distribution and amplitude distribution being located in the plane of the light source comprises an asymmetry in order to generate an asymmetrical profile of the refractive index modulation in the recording medium.

13. The method according to claim 1, wherein the recording medium has an initiator and where a constant light portion of the exposure light is used to activate the initiator of the recording medium.

14. The method according to claim 1, wherein an optically or electrically addressable material serves as the recording medium for the generation of switchable volume gratings.

15. The method according to claim 1, wherein reconstruction geometries such as plane wave to plane wave or plane wave to spherical wave, are realisable in a presettable fix or switchable form through diffraction at the generatible volume gratings.

16. The method according to claim 1, wherein reflections during the recording of the volume gratings in the recording medium can be suppressed through a presettable choice of at least one of the spatial and temporal coherence properties of the exposure light.

17. The method according to claim 1, wherein a phase grating whose period varies continuously or periodically is disposed in the plane of the light source which illuminates the master grating.

18. The method according to claim 1, wherein at least two phase-shifted volume gratings are generated in the recording medium in order to deflect preset angular or wavelength ranges in preset directions or where volume gratings are generated such that they are staggered in depth in the recording medium, each serving different wavelengths in order to compensate transit time differences in light pulses.

19. The method according to claim 1, wherein the recording of a volume grating with preset shape and thickness at a preset depth of the recording medium is achieved through chemical or optical depletion of an initiator in the recording medium from the surfaces inwards, where the recording of a volume grating with preset shape and thickness at a preset depth of the recording medium could especially be achieved through local optical depletion of an initiator in the recording medium.

20. The method according to claim 1, wherein for a preset profile of the refractive index modulation the transfer function of the recording medium must be considered when designing the interference contrast.

21. The method according to claim 1, wherein at least one of a depth separation and a depth apodisation of the refractive index modulation in the recording medium is generated using a beat function of the degree of temporal coherence of the exposure light, where the beat function of the degree of temporal coherence could be generated in the exposure light especially using at least two separated spectral ranges of the light source.

22. The method according to claim 21, where the envelope of the beat function of the degree of temporal coherence is determined by the shape of the sections of the spectral distribution of the light source.

23. The method according to claim 1, wherein a presettable interference contrast is generated in the recording medium by way of superposition of an incident wave front and its reflected wave front, which is reflected from a direction-specifically reflective medium which is disposed immediately adjacent to the exit-side surface of the recording medium, where the reflective medium could be at least one switchable reflective liquid crystal grating.

24. The method according to claim 1, wherein for the generation of volume gratings by way of replication at least one controllable polarization-dependent liquid crystal grating is used as the master grating.

25. The method according to claim 1, wherein at least one metal interference filter, transmissive or reflective dielectric layer stack, fix or variable Fabry-Perot interference filter, transmissive or reflective volume grating or modified spectrometer is used as spectral filter for the exposure light.

26. The method according to claim 1, wherein preset beat segments of the interference contrast in the recording medium are used for the generation of volume gratings whose size is limited in the longitudinal direction at preset distances with symmetrical apodisation profiles.

27. The method according to claim 1, wherein the influence the optical path difference which is caused by the angle between directions of propagation of the interfering wave fronts on the lateral extent of the generatable interference contrast in the recording medium is annulated in that the interference occurs between an incident wave and a reflected wave which is reflected from a reflective surface which is disposed in direct contact with the exit-side surface of the recording medium.

28. A beam combiner comprising a recording medium with at least two volume gratings with presettable thickness and serving for superposition of the light which is emitted by pixels of a light modulator, where the volume gratings are generated in the recording medium using the method according to claim 1.

29. The beam combiner according to claim 28, where the volume gratings have an angular selectivity whose width and/or profile is presettable.

30. The beam combiner according to claim 28, comprising two volume grating stacks disposed one after another in a direction of light propagation, each having three polarisation- and wavelength-selective volume gratings with presettable thickness for the primary colours, where the two volume grating stacks are separated by a spacer layer that has another presettable thickness.

31. The beam combiner according to claim 28, wherein the total thickness of the volume grating stacks including the spacer layer does not exceed a preset value if an aperture stop is provided following the beam combiner in the direction of light propagation and/or where an angular tolerance of a reconstruction geometry of <0.1° is maintained for all three primary colours and all six volume gratings of the volume grating stacks.

32. Execution of the method according to claim 1 in order to store data or safety features, where during the recording of the data or safety features in the recording medium in the form of volume gratings depth division multiplexing is realised in addition to at least one of the angle division multiplexing and the wavelength division multiplexing, or where the profile of the angular selectivity or wavelength selectivity is presettable, so that side peaks of the angular or wavelength selectivity are suppressed.

33. A device for the layered generation of at least one volume grating in a recording medium by way of exposure with exposure light being emitted by a light source, in particular for the implementation of the method according to claim 1, with a light source and with a beam splitter means, said recording medium comprising at least one photosensitive layer which is sensitised for a presettable wavelength of the exposure light, Wherein the beam splitter means is a master grating and is designed and disposed in front of the recording medium and is illuminated with a collimated wave field which is generated by the light source such that the exposure light is dividable by diffraction at the master grating into at least two wave fronts of coherent light which are capable of generating interference, Wherein each of the volume gratings is generatible in the recording medium by the at least two wave fronts of coherent light which are capable of generating interference, Wherein the at least two wave fronts of coherent light which are capable of generating interference are superposable in the recording medium at a presettable angle, at a presettable depth and with a presettable interference contrast, Wherein at least one of the depth and the thickness of the refractive index modulation and transparency modulation of a volume grating in the recording medium is controllable through depth-specific control of at least one of a spatial and a temporal degree of coherence of the interfering wave fronts in the direction of light propagation, and Wherein at least one of an amplitude grating and a phase grating is arranged in a plane of the light source which illuminates the master grating, the at least one of the amplitude grating and the phase grating generates the presettable depth-dependent profile of the interference contrast in a presettable depth range of the recording medium.

34. The device according to claim 33, wherein the beam splitter means comprises a diffraction grating or a surface profile grating.

* * * * *